US012761965B2

(12) United States Patent
ChoFleming, Jr. et al.

(10) Patent No.: US 12,761,965 B2
(45) Date of Patent: Oct. 13, 2026

(54) CODE OBJECTS OFFLOAD BASED ON ACCELERATOR, ACCELERATOR CACHE AND DATA TRANSFER METRICS

(71) Applicant: Intel Corporation, Santa Clara, CA (US)

(72) Inventors: Kermin E. ChoFleming, Jr., Hudson, MA (US); Egor A. Kazachkov, Nizhny Novgorod (RU); Daya Shanker Khudia, Fremont, CA (US); Zakhar A. Matveev, Nizhniy Novgorod (RU); Sergey U. Kokljuev, Nizhny Novgorod (RU); Fabrizio Petrini, Menlo Park, CA (US); Dmitry S. Petrov, Nizhny Novgorod Oblast (RU); Swapna Raj, Norwalk, CT (US)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 18/030,057

(22) PCT Filed: Apr. 23, 2021

(86) PCT No.: PCT/US2021/028952

§ 371 (c)(1),
(2) Date: Apr. 3, 2023

(87) PCT Pub. No.: WO2022/125133

PCT Pub. Date: Jun. 16, 2022

(65) Prior Publication Data

US 2023/0367640 A1 Nov. 16, 2023

Related U.S. Application Data

(60) Provisional application No. 63/122,937, filed on Dec. 8, 2020.

(51) Int. Cl.
*G06F 9/50* (2006.01)
*G06F 11/30* (2006.01)
*G06F 11/34* (2006.01)

(52) U.S. Cl.
CPC .......... *G06F 9/5044* (2013.01); *G06F 11/302* (2013.01); *G06F 11/3409* (2013.01); *G06F 2201/865* (2013.01); *G06F 2209/509* (2013.01)

(58) Field of Classification Search
CPC .. G06F 9/5044; G06F 11/302; G06F 11/3409; G06F 2201/865; G06F 2209/509; G06F 9/5027
See application file for complete search history.

(56) References Cited

U.S. PATENT DOCUMENTS 8,970,607 B2 3/2015 Harney et al.
9,166,597 B1 * 10/2015 Denisenko ....... H03K 19/17728
(Continued)

OTHER PUBLICATIONS

PCT International Search Report and Written Opinion issued in PCT/US2021/028952, dated Aug. 31, 2021; 8 pages.

*Primary Examiner* — Benjamin C Wu
(74) *Attorney, Agent, or Firm* — Alliance IP, LLC

(57) ABSTRACT

An offload analyzer analyzes a program for porting to a heterogeneous computing system by identifying code objects for offloading to an accelerator. Runtime metrics generated by executing the program on a host processor unit are provided to an accelerator model that models the performance of the accelerator and generates estimated accelerator metrics for the program. A code object offload selector selects code objects for offloading based on whether estimated accelerated times of the code objects, which comprise estimated accelerator times and offload overhead times, are better than their host processor unit execution times. The code object offload selector selects additional code objects for offloading using a dynamic-programming-like perfor-
(Continued)

mance estimation approach that performs a bottom-up traversal of a call tree. A heterogeneous version of the program can be generated for execution on the heterogeneous computing system.

20 Claims, 9 Drawing Sheets

(56) References Cited

U.S. PATENT DOCUMENTS 10,447,273 B1 10/2019 Roberts et al.
10,585,718 B2 * 3/2020 Sardino ................. G06F 9/5044
10,862,805 B1 * 12/2020 Dods ................... H04L 63/0254
11,716,355 B1 * 8/2023 Maeng .................. H04L 63/105
2010/0050004 A1 * 2/2010 Hamilton, II ......... G06F 1/3234 713/320
2012/0185674 A1 * 7/2012 Taylor .................. H03K 19/177 712/E9.016
2012/0297238 A1 * 11/2012 Watson ................. G06F 9/5088 714/4.11
2013/0031390 A1 * 1/2013 Smith, III ............. G06F 1/3293 713/320
2015/0046679 A1 * 2/2015 Gathala ................. G06F 9/4552 712/30
2015/0277877 A1 * 10/2015 Feng ......................... G06F 8/51 717/160
2016/0080284 A1 * 3/2016 Jeon .......................... G06F 9/50 709/226
2016/0162004 A1 * 6/2016 Ljubuncic ............. G06F 9/5083 713/320
2016/0328562 A1 * 11/2016 Saxena ................. G06F 21/566
2017/0090988 A1 * 3/2017 Young ................... G06F 9/5094
2017/0228269 A1 * 8/2017 Yang ....................... G06F 9/548
2018/0081804 A1 * 3/2018 Turner .................. G06F 9/5083
2018/0081809 A1 * 3/2018 Turner .................. G06F 12/084
2018/0081817 A1 * 3/2018 Turner ................ G06F 12/0815
2018/0157531 A1 * 6/2018 Bobba ................... G06F 9/5044
2018/0293690 A1 * 10/2018 Ray ..................... G06F 12/0815
2019/0018806 A1 * 1/2019 Koufaty .............. G06F 12/0806
2019/0042232 A1 * 2/2019 Trika .................... G06F 9/5055
2019/0102292 A1 * 4/2019 Agarwal ................. G06F 12/06
2019/0102311 A1 * 4/2019 Gupta ................. G06F 12/0831
2019/0155367 A1 5/2019 Rao et al.
2019/0155658 A1 5/2019 Cheng et al.
2019/0188043 A1 * 6/2019 Jalai ...................... G06F 9/4875
2019/0317740 A1 * 10/2019 Herr .......................... G06F 8/41
2019/0317741 A1 * 10/2019 Herr .......................... G06F 8/41
2019/0317880 A1 * 10/2019 Herr ..................... G06N 3/0985
2019/0324755 A1 * 10/2019 Herr .......................... G06F 8/45
2020/0195731 A1 * 6/2020 Guo ........................ H04L 67/63
2020/0219224 A1 * 7/2020 Maruyama ................ G06T 1/20
2022/0038376 A1 * 2/2022 Mowat ................ H04L 47/2441
2022/0043765 A1 * 2/2022 Gong .................... G06F 3/0619
2022/0350671 A1 * 11/2022 Albisu .................. G06F 9/5072
2023/0367640 A1 * 11/2023 ChoFleming, Jr. ... G06F 9/5044
2025/0254108 A1 * 8/2025 Thiruchengode Vajravel ............. H04L 43/0817

* cited by examiner

CODE OBJECTS OFFLOAD BASED ON ACCELERATOR, ACCELERATOR CACHE AND DATA TRANSFER METRICS

CROSS-REFERENCE TO RELATED APPLICATIONS

This Application is a national stage application under 35 U.S.C. § 371 of PCT International Application Serial No. PCT/US2021/028952, filed on Apr. 23, 2021, and entitled, "PROGRAM EXECUTION STRATEGIES FOR HETEROGENEOUS COMPUTING SYSTEMS," which application claims the benefit of priority to U.S. Provisional Patent Application Ser. No. 63/122,937 filed on Dec. 8, 2020, and entitled "PROGRAM EXECUTION STRATEGY SELECTION IN HETEROGENEOUS SYSTEMS." The disclosures of the prior applications are considered part of and are hereby incorporated by reference in their entirety in the disclosure of this application.

BACKGROUND

The performance of a program on a homogeneous computing system may be improved by porting the program to a heterogeneous system in which various code objects (e.g., loops, functions) are offloaded to an accelerator of the heterogeneous computing system.

DETAILED DESCRIPTION

Figure 1:
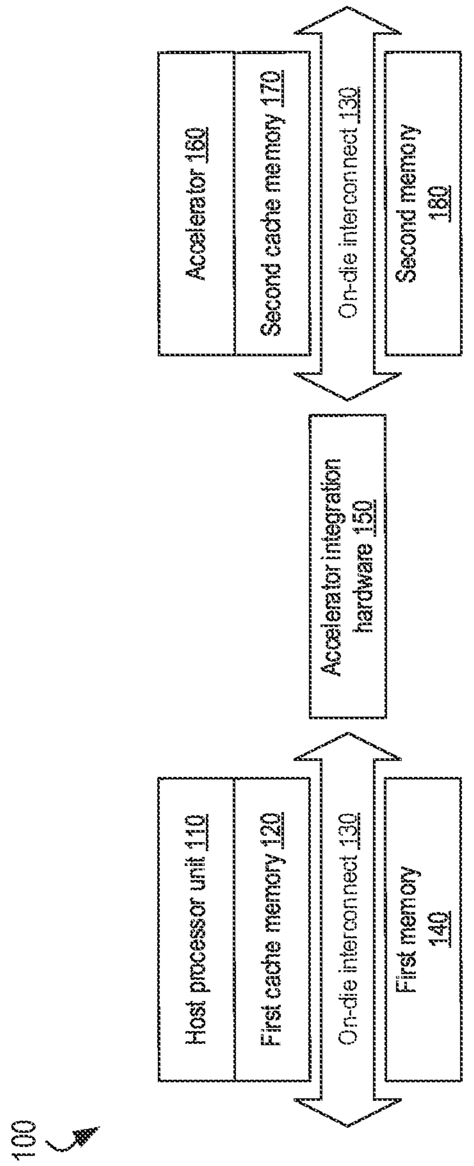
FIG. 1 is a block diagram of an example computing system on which heterogeneous programs generated by an offload advisor can operate.

Computing systems have become increasingly heterogeneous with an expanded class of accelerators operating alongside host processor units. These accelerators comprise new classes of accelerators, such as those represented by the Intel® Data Streaming Accelerator (DSA) and Intel® Hardware Queue Manager (HQM), and existing accelerator types (e.g., graphics processor units (GPUs), general-purpose GPUs (GPGPUs), accelerated processor units (APUs), and field-programmable gate arrays (FPGAs)). Effectively leveraging accelerators to reduce program execution time can be challenging in existing software systems as it can be difficult for programmers to understand when an accelerator can be beneficially used, especially for large software systems. Various factors can complicate the decision to offload a portion of a program to an accelerator. Accelerator execution models (e.g., vector, spatial) and optimization patterns are different from those for some host processor units (e.g., x86 processors) and it can be unclear which code segments of a program possess the right properties to map to an accelerator and how much additional performance can be achieved by offloading to an accelerator. Further, utilizing an accelerator incurs additional overhead, such as program control and data transfer overhead, and this overhead should be more than offset by the execution time reduction gains by offloading program portions to an accelerator to make the offloading beneficial. As a result, while advanced programmers may be able to identify and analyze key program loops for potential offloading, it can be difficult to identify and exploit all potential program portions that could be offloaded for program performance gains.

Disclosed herein is an offload advisor to help programmers better utilize accelerators in heterogeneous computer systems. The offload advisor comprises an automated program analysis tool that can recommend accelerator-enabled execution strategies based on existing programs, such as any existing x86 program, and estimate performance results of the recommended execution strategies. As used herein, the term "accelerator" can refer to any processor unit to be utilized for program acceleration, such as a GPU, FPGA, APU, configurable spatial accelerators (CSAs), coarse-grained reconfigurable arrays (CGRAs), or any other type of processor unit. Reference to computing system heterogeneity refers to the availability of different types of processor units in a computing system for program execution. As used herein, the term "host processor unit" refers to any processor unit designated for executing program code in a computing system.

An offload advisor can help programmers estimate the performance of existing programs on computing systems with heterogeneous architectures, understand performance-limiting bottlenecks in the program, and identify offload implementations (or strategies) for a given heterogeneous architecture that improves program performance. Offload analyses can be performed at near-native runtime speeds. To generate performance estimates for a heterogeneous program (a version of the program under analysis that, when executed, offloads code objects from a host processor unit to an accelerator), runtime metrics generated from the execution of the program on a host processor unit are transformed to reflect the behavior of the heterogeneous architecture. The offload analysis can utilize a constraint-based roofline model to explore possible offload implementation options.

In some embodiments, the offload advisor comprises an analytic accelerator model. The accelerator model can model a broad class of accelerators, including spatial architectures and GPUs. While the offload advisor is capable of assisting programmers in estimating program performance based on existing silicon solutions, the flexibility of its internal models also allows programmers to estimate program behavior on future heterogeneous silicon solutions. As the offload advisor can operate without exposing customer software intellectual property, it can also allow for early customer-driven improvements of future processor architectures.

In some embodiments, the offload advisor generates estimated accelerator metrics for program code objects (regions, portions, parts, or segments—as used herein, these terms are used interchangeably) based on runtime metrics collected during execution of the program on a host processor unit, such as an x86 processor. The offload advisor can also generate modeled accelerator cache metrics that estimate accelerator cache behavior based on an accelerator cache model that utilizes runtime metrics. The accelerator cache model can account for differences between the host processor unit and accelerator architectures. For example, the accelerator cache model can filter memory accesses from the runtime metrics to account for an accelerator that has a larger register file than a host processor unit. In some embodiments, the offload advisor comprises a tracker that reduces or eliminates certain re-referenced memory requests, as these requests are likely to be captured in the accelerator register file. The offload advisor can further generate modeled data transfer metrics based on runtime metrics. For example, the offload analyzer can track the memory footprint of each loop or function, which allows for a determination of how much memory and which memory structures in memory are used by the loop or function. The runtime metrics can comprise metrics indicating the memory footprint for code objects, which can be used by the data transfer model to estimate how much offload overhead time is spent in transferring data to an offloaded code object.

Once estimated accelerator metrics are generated, the offload advisor estimates the performance of code objects if offloaded to the target accelerator. The offload analyzer uses a constraint-based approach in which target platform characteristics, such as cache bandwidth and data path width, are used to estimate accelerator execution times for code objects based on various constraints. The maximum of these estimated accelerator execution times is the estimated accelerator execution time for the code object. There is also overhead associated with transferring control and data to the accelerator. These offload costs are added to the estimated accelerator execution time to derive an estimated accelerated time for the code object. If a code object is to run quicker on an accelerator than on a host processor unit based on its host processor unit execution time and estimated accelerated time, the code object is selected for offloading.

In some embodiments, the offload advisor utilizes a dynamic-programming-like bottom-up performance estimation approach to select code objects for offloading that, if considered independently, would run slower if offloaded to an accelerator. In some instances, the relative cost of transferring data and program control to the accelerator can be reduced by executing more temporally local (e.g., a loop nest) portions of the program on the accelerator. In some scenarios, it may make sense to offload a code object that executes slower on the accelerator than on a host processor unit (e.g., serial code running on an x86 processor) to avoid the cost of moving data.

In some embodiments, the offload advisor uses the following approach to account for the sharing of data structures by multiple loops to improve the offload strategy. In a call tree (or call graph) of a program (in which an individual node has an associated code object), beginning with its leaf nodes, the offloading of a code object associated with a parent node is analyzed for possible offloading with and without the code objects associated with its children nodes. To analyze the offloading of a combined loop nest, the memory footprint of each loop (e.g., the amount of memory used and which data structures are used by the loop) is used to determine data sharing patterns and modify the estimated accelerated time for the loops according to the increased or decreased memory use. The loop nest offload is compared to the best offload strategies of its child loops. The better of offloading the whole loop nest (parent loop plus child loops), or not offloading the parent and following the best offload strategies for the children loops is selected and the process proceeds up to the root of the call tree.

The offload advisor described herein provides advantages and improvements over existing accelerator performance estimation approaches. Some existing approaches rely on cycle accurate simulators that can accurately simulate how microkernels will perform on an accelerator architecture. While cycle accurate accelerator simulators can provide accurate performance predictions, they can run several orders of magnitude slower than a program's runtime. This limits their use to microkernels or small program segments. Real programs are much more complex and can run for billions of cycles. Cycle accurate simulators also require the program to have been ported to the accelerator and possibly optimized for it. This limits analysis to a handful of kernels.

For commercial programs, which can be quite large, manual examination of the code may be performed to identify key loops and analytical models may be built to support offload analysis. In some instances, these efforts may be partially supported by automated profilers that can extract application metrics. Some accelerator performance estimation approaches have been explored in academia, but these approaches are partially manual, rather than being fully automated. Manual examination of preselected key offload regions of a program does not provide enough insight into the impact of accelerators on the whole program and may be beyond the capabilities of average programmers.

Further, some existing analytical models that estimate offloaded overheads require users to identify offloaded regions prior to analysis. This does not allow a user to easily consider various offload strategy trade-offs and may result in the selection of an offload strategy that is inferior to other possible offload strategies.

Moreover, good analytic models of accelerators require a good understanding of the details of the underlying hardware, which may not be publicly available, even for production silicon. External analytical models may lack sufficiently detailed architectural characterization to predict the behavior of the program portions on future silicon. Such theoretical models provide limited insights into system trade-off studies prior to the determination of a final design.

The offload advisor technologies disclosed herein allow users to analyze how industry-sized real-world applications that run on host processor units may perform on heterogeneous architectures in near-native time. The offload advisor does not require users to compile code for accelerators and does not require accelerator silicon. The offload advisor can estimate the performance improvement potential of a program ported to a heterogeneous computing system, which can help system architects customize their systems. Further, the offload advisor can aid in the collaboration of accelerator and SoC (system on a chip) design by providing feedback on how future product performance and/or accelerator features can impact program performance.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics. The phrases "in an embodiment," "in embodiments," "in some embodiments," and/or "in various embodiments," may each refer to one or more of the same or different embodiments.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Furthermore, the terms "comprising," "including," "having," and the like, as used with respect to embodiments of the present disclosure, are synonymous.

As used herein, the term "integrated circuit component" refers to a packaged or unpacked integrated circuit product. A packaged integrated circuit component comprises one or more integrated circuits mounted on a package substrate. In one example, a packaged integrated circuit component contains one or more processor units mounted on a substrate, with an exterior surface of the substrate comprising a solder ball grid array (BGA). In one example of an unpackaged integrated circuit component, a single monolithic integrated circuit die comprises solder bumps attached to contacts on the die. The solder bumps allow the die to be directly attached to a printed circuit board. An integrated circuit component can comprise one or more of any computing system component described or referenced herein or any other computing system component, such as a processor unit (e.g., SoC, processor core, GPU, accelerator), I/O controller, chipset processor, memory, or network interface controller.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the software or firmware instructions are not actively being executed by the system, device, platform, or resource.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an example computing system on which heterogeneous programs generated by an offload advisor can operate. The computing system 100 comprises a host processor unit 110, a first cache memory 120, an on-die interconnect (ODI) 130, a first memory 140, accelerator integration hardware 150, an accelerator 160, a second cache memory 170, and a second memory 180. The host processor unit 110 has access to a memory hierarchy that comprises the first cache 120 and the first memory 140. The ODI 130 allows for communication between the host processor unit 110 and the accelerator 160. The ODI 130 can comprise a network, such as a mesh network or a ring network, that connects multiple constituent components of an integrated circuit component. In some embodiments, the ODI 130 can comprise an interconnect technology capable of connecting two components located on the same integrated circuit die or within the same integrated circuit component but located on separate integrated circuit dies, such as Peripheral Component Interconnect Express (PCIe), Compute Express Link (CXL), and Nvidia® NVLink.

The accelerator 160 has access to a memory hierarchy that comprises the second cache memory 170 and the second memory 180. The accelerator 160 can be located on the same integrated circuit die as the host processor unit 110, within the same integrated circuit component as but on a different integrated circuit die than the host processor unit 110, or within an integrated circuit component that is separate from the integrated circuit component comprising the host processor unit 110. If the accelerator 160 and the host processor unit 110 are located on separate integrated circuit components, they can communicate via any interconnect technology that allows for communication between computing system components, such as PCIe, Intel® Ultra Path Interconnect (UPI), or Intel® QuickPath Interconnect (QPI). In some embodiments, the memory hierarchy accessible by the processor unit 110 comprises the second memory 180 and the memory hierarchy accessible by the accelerator 160 comprises the first memory 140.

Figure 2:
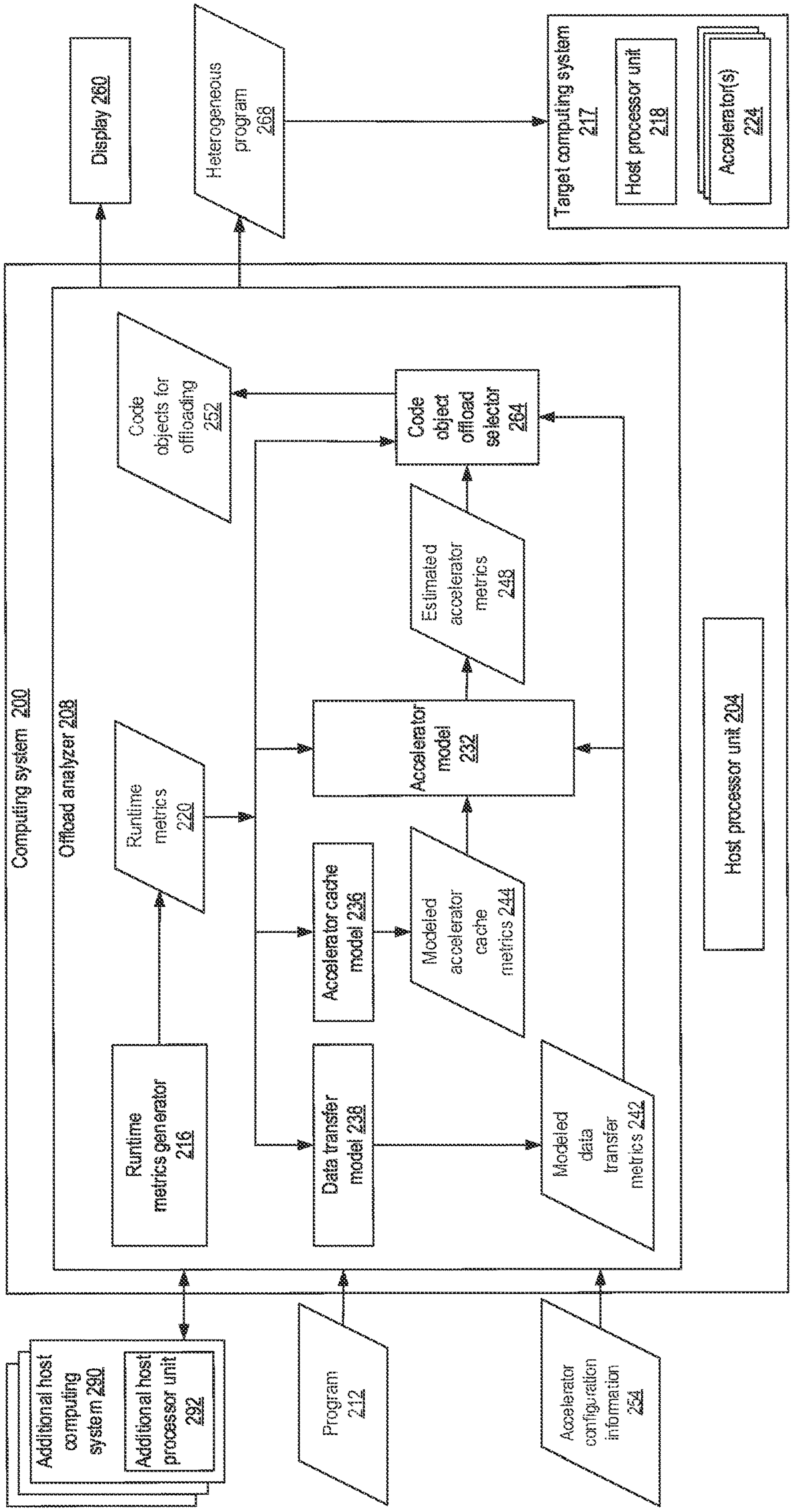
FIG. 2 is a block diagram of an example offload analyzer operating on an example computing system.

FIG. 2 is a block diagram of an example offload analyzer operating on an example computing system. The computing system 200 comprises a host processor unit 204 and an offload analyzer 208. The offload analyzer 208 is software that operates on the hardware resources (including the host processor unit 204) of the computing system 200. In other embodiments, the offload analyzer 208 can be firmware, hardware, or a combination of software, firmware, or hardware. The offload analyzer 208 estimates the performance improvements of a program 212 executing on a heterogeneous target computing system 217, comprising a host processor unit 218 (which can be of the same processor type as the host processor 204 or a different processor type) and an accelerator 224, over the performance of the program 212 executing on the host processor unit 204 and without the benefit of an accelerator. The estimated performance improvements are based on estimated performance improvements of code objects of the program 212 if the program were ported to the targeted computing system 217 and the code objects were offloaded to the accelerator 224. The offload analyzer 208 can consider various offload implementations (or offload strategies) in which different sets of code objects are considered for offloading and determine an offload implementation that provides the best performance improvement out of the various offload implementations considered. The program 212 can be any program executable on a host processor unit.

The offload analyzer 208 comprises a runtime metrics generator 216, an accelerator model 232, an accelerator cache model 236, a data transfer model 238, and a code object offload selector 264. The runtime metrics generator 216 causes the program 212 to be executed by the host processor unit 204 to generate the runtime metrics 220 that are used by the accelerator model 232, the accelerator cache model 236, and the data transfer model 238. The runtime metrics 220 (or actual runtime metrics, observed runtime metrics) can be generated by instrumentation code that is added to the program 212 prior to execution on the host processor unit 204. This instrumentation code can generate program performance information during execution of the program 212 and the runtime metrics 220, which can comprise the program performance information. Thus, the runtime metrics 220 indicate the performance of the program executing on the host processor unit. The runtime metrics 220 can comprise metrics indicating program operation balance, program dependency characteristics and other program characteristics. The runtime metrics 220 can comprise metrics such as loop trip counts, the number of instructions performed in a loop iteration, loop execution time, number of function calls, number of instructions performed in a function call, function execution times, data dependencies between code objects, the data structures provided to a code object in a code object call, data structures returned by a called code object, code object size, number of memory access (read, write, total) made by a code object, amount of memory traffic (read, write, total) between the host processor unit and the memory subsystem generated during execution of a code object, memory addresses accessed, number of floating-point, integer, and total operations performed by a code object, and execution time of floating-point, integer, and total operations performed by a code object. The runtime metrics 220 can be generated for the program as a whole and/or individual code objects. The runtime metrics 220 can comprise average, minimum, and maximum values for various runtime metrics (e.g., loop trip counts, loop/function execution time, loop/function memory traffic).

In some embodiments, the instrumentation code can be added by an instrumentation tool, such as the "pin" instrumentation tool offered by Intel®. An instrumentation tool can insert the instrumentation code into an executable version of the program 212 to generate new code and cause the new code to execute on the host processor unit 204.

In addition to the runtime metrics 220 comprising program performance information generated during executing of the program 212 on the host processor unit 204, the runtime metrics 220 can further comprise metrics derived by the runtime metrics generator 216 from the program performance information. For example, the runtime metrics generator 216 can generate arithmetic intensity (AI) metrics that reflect the ratio of operations (e.g., floating-point, integer) performed by the host processor unit 204 to the amount of information sent from the host processor unit 204 to cache memory of the computing system 200. For instance, one AI metric for a code object can be the ratio of floating operation performed per second by the host processor unit 204 to the number of bytes sent by the host processor unit to the L1 cache.

The code objects of a program can be identified by the runtime metrics generator 216 or another component of the offload analyzer 208. In some embodiments, code objects within the program 212 can be identified in code object information supplied to the offload analyzer 208. In some embodiments, the runtime metrics 220 comprise metrics for fewer than all of the code objects in the program 212.

Accelerators can have architectural features that are different from host processor units, such as wider vector lanes or larger register files. Due to these differences, the runtime metrics 220 may need to be modified to reflect the expected performance of code objects on an accelerator. The offload analyzer 208 utilizes several models to estimate the performance of code objects offloaded to an accelerator: the accelerator model 232, the accelerator cache model 236, and the data transfer model 238. The accelerator model 232 generates estimated accelerator metrics 248 indicating estimated performance for code objects if they were offloaded to a target accelerator. For example, for accelerators with configurable architectures (e.g., FPGA, configurable spatial accelerators (CSAs)), the number of accelerator resources used in the offload analysis is estimated from the host processor unit instruction stream and runtime metrics 220 associated with the consumption of compute resources on the host processor unit 204 can be used to generate estimated compute-bound accelerator execution time of offloaded code objects.

The accelerator cache model 236 models the performance of the memory hierarchy available to the accelerator on the target computing system. The accelerator cache model 236 models the cache memories (e.g., L1, L2, L3, LLC) and can additionally model one or more levels of system memory (that is, one or more levels of memory below the lowest level of cache memory in the memory hierarchy, such as a first level of (embedded or non-embedded) DRAM). In some embodiments, the accelerator cache model 236 models memory access elision. For example, some host processor unit architectures, such as x86 processor architectures, are relatively register-poor and make more programmatic accesses to memory than other architectures. To account for this, the accelerator cache model 236 can employ an algorithm that removes some memory access traffic by tracking a set of recent memory accesses equal in size to an amount of in-accelerator storage (e.g., registers). The reduced memory stream can be used to drive the accelerator cache model 236 to provide high fidelity modeling of accelerator cache behavior.

The accelerator cache model 236 generates modeled accelerator cache metrics 244 based on the runtime metrics 220 and accelerator configuration information 254. The accelerator configuration information 254 allows for variations in various accelerator features, such as cache configuration and accelerator operational frequency to be explored in the offload analysis for a program. The accelerator configuration information 254 can specify, for example, the number of levels in the cache, and, for each level, the cache size, number of ways, number of sets, and cache line size. The accelerator configuration information 254 can comprise more or less configuration information in other embodiments. The runtime metrics 220 utilized by the accelerator cache model 236 to generate the modeled accelerator cache metrics 244 comprise metrics related to the amount of traffic sent between the host processor unit 204 and the cache memory available to the host processor unit. The modeled accelerator cache metrics 244 can comprise metrics for one or more of the cache levels (e.g., L1, L2, L3, LLC (last level cache)). If the target accelerator is located in an SoC, the LLC can be a shared memory between the accelerator and a host processor unit. The modeled accelerator cache metrics 244 can further comprise metrics indicating the amount of traffic to a first level of DRAM (which can be embedded DRAM or system DRAM) in the memory subsystem. The modeled accelerator cache metrics 244 can comprise metrics on a code object basis as well as on a per-instance and/or a per-iteration basis for each code object.

The data transfer model 238 models the offload overhead associated with transferring information (e.g., code objects, data) between a host processor unit and an accelerator. The data transfer model 238 accounts for the locality of the accelerator to the host processor unit, with data transfer overhead being less for accelerators located on the same integrated circuit die or integrated circuit component as a host processor unit than an accelerator located in a separate integrated circuit component from the one containing the host processor unit. The data transfer model 238 utilizes the runtime metrics 220 (e.g., code object call frequency, code object data dependencies (such as the amount of information provided to a called code object, the amount of information returned by code object), code object size) to generate modeled data transfer metrics 242. The modeled data transfer metrics 242 can comprise an estimated amount of offload overhead for individual code objects associated with data transfer between a host processor unit and an accelerator.

The accelerator model 232 models the behavior of the accelerator on which offloaded code objects are to run and generates estimated accelerator metrics 248 for the program 212 based on the runtime metrics 220, the modeled accelerator cache metrics 244, and the modeled data transfer metrics 242. In some embodiments, the estimated accelerator metrics 248 are further generated based on the accelerator configuration information. The estimated accelerator metrics 248 comprise metrics indicating the estimated performance of offloaded program code objects. The estimated accelerator metrics 248 include an estimated accelerator execution time for individual code objects. In some embodiments, the accelerator model 232 utilizes Equations (1) and (2) or similar equations to determine an estimated accelerated time for an offloaded code object.

$$T_{accelerated} = T_{overhead} + T_{accel\ exec} \quad (1)$$

$$T_{accel\ exec} = \max\begin{cases} T^{Compute} \\ T^{Memory_k}(M^k) = \dfrac{M^k}{BW_k} \end{cases} \quad (2)$$

The estimated accelerated time for a code object, $T_{accelerated}$, includes an estimate of the overhead involved in offloading the code object to the accelerator, $T_{overhead}$, and an estimated accelerator execution time for the code object, $T_{accel\ exec}$.

The estimated offload overhead time can depend on the accelerator type and the architecture of the target computing system. The estimated offload overhead time for a code object can comprise one or more of the following components: a modeled data transfer time generated by the data transfer model 238, a kernel launch overhead time, and reconfiguration time. Not all of these offload overhead components may be present in a particular accelerator. The kernel launch time can represent the time to invoke a function to be run on the accelerator by the code object (e.g., the time to copy kernel code to the accelerator), and the reconfiguration time can be the amount of time it takes to reconfigure a configurable accelerator (e.g., FPGA, Configurable Computing Accelerator).

The estimated accelerator execution time is based on a compute-bound constraint and one or more memory-bound constraints. As such, Equation (2) can be considered to be a roofline model for determining an estimated accelerator execution time. In other embodiments, the estimated accelerator execution time for a code object can consider additional constraints, such as software constraints (e.g., loop iteration counts and data dependencies, such as loop-carried dependencies). $T^{Compute}$ is an estimated compute-bound accelerator execution time for a code object and can be based on one or more of the runtime metrics 220 associated with the code object, such as loop trip count, function/loop call count, number of floating-point and integer operation performed in a loop or function, code object execution time. Some existing accelerator classes are more parallel than some existing classes of host processor units and in some embodiments, the accelerator model 232 determines whether accelerator parallelism can be utilized by analyzing loop trip counts and cross-iteration dependencies in the runtime metrics 220. Depending on the type of accelerator being contemplated for use in offloading, different algorithms can be used to convert runtime metrics to estimated accelerator metrics.

$T^{Memory_k}$ is an estimated memory-bound accelerator execution time for a code object for the kth level of the memory hierarchy of the target computing system 217. $M^k$ represents the memory traffic at the kth level of the memory hierarchy for the code object and $BW_k$ represents the memory bandwidth of the kth level of the memory hierarchy. $M^k$ is generated by the accelerator cache model 236 and is included in the modeled accelerator cache metrics 244. As there are multiple memory levels in a memory hierarchy, any one of them (e.g., L1, L2, L3, LLC, DRAM) could set the estimated accelerator execution time for a code object.

The estimated accelerator metrics 248 can comprise, for individual code objects, an estimated accelerated time, an estimated offload overhead time, an estimated accelerator execution time, a modeled data transfer time, an estimated compute-bound accelerator execution time, and an estimated memory-bound accelerator execution time for multiple memory hierarchy levels. Additional estimated accelerator metrics 248 can comprise a speed-up factor reflecting an improvement in offloaded code object performance, an estimated amount of memory traffic (read, write, total), and an estimated amount of data transferred from the host processor unit to the accelerator and vice versa.

Figure 5:
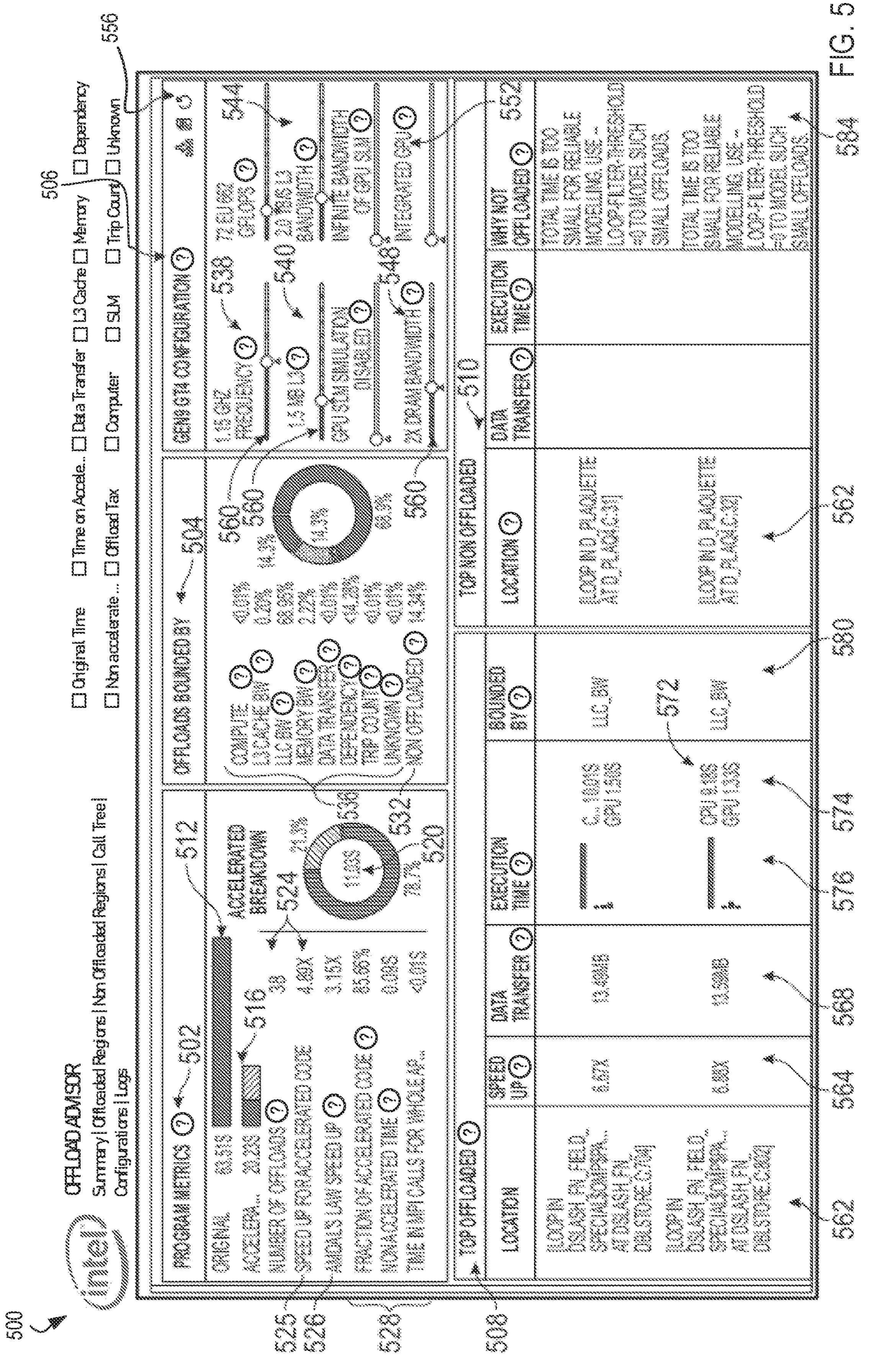
FIG. 5 shows an example offload analysis report.
Figure 6:
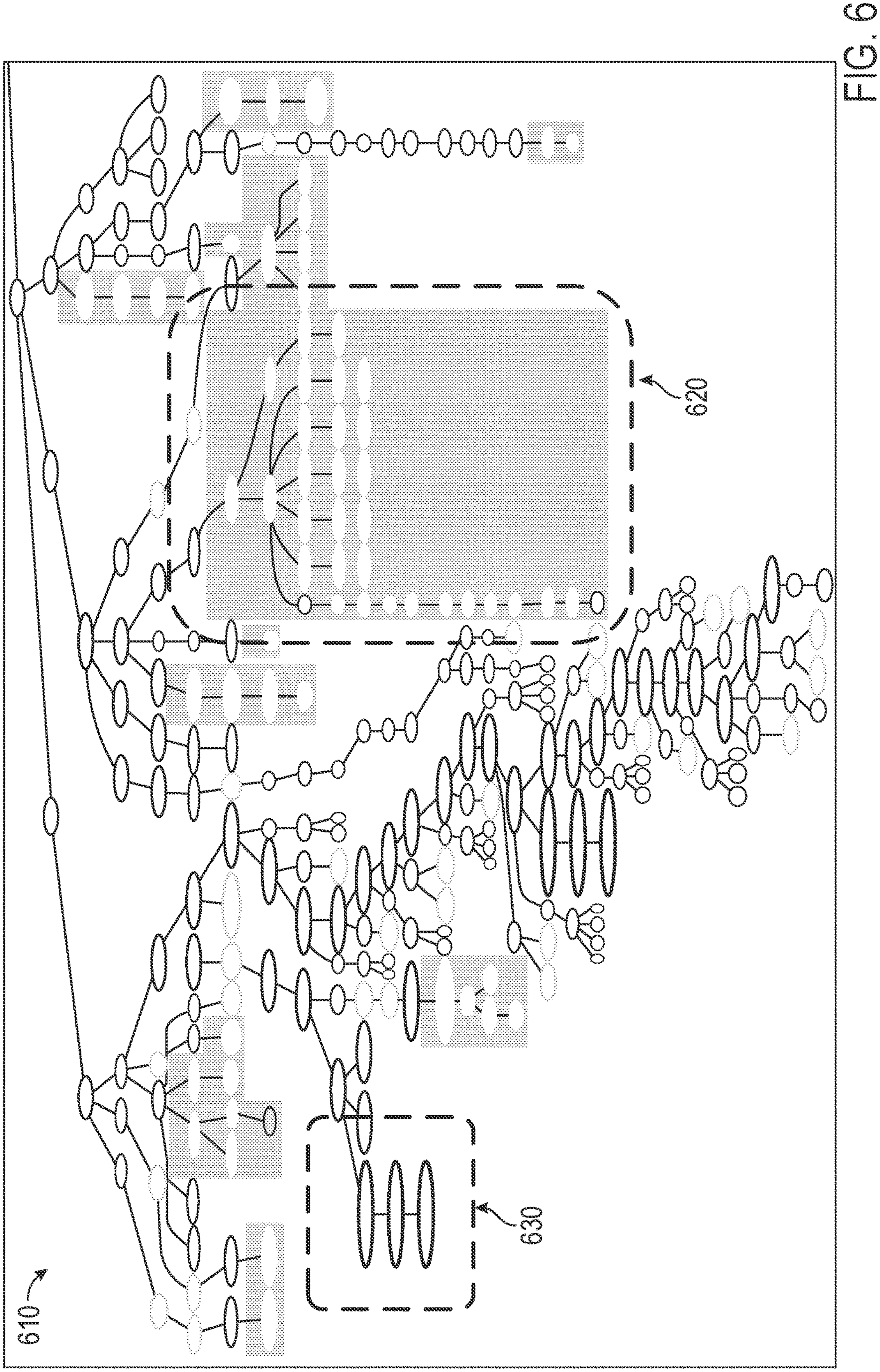
FIG. 6 shows a graphical representation of an offload implementation.

In some embodiments, the accelerator model 232 can determine which code objects are offloadable and determine estimated accelerated times for just the offloadable code objects. Code objects can be determined to be offloadable based on code object characteristics and/or accelerator characteristics. For example, a loop code object can be determined to be offloadable if the loop can be implemented in the accelerator. That is, for a spatial accelerator, a loop can be determined to be offloadable if there are enough programming elements in the accelerator to implement the loop. The code object offload selector 264 can select code objects for offloading 252 based on the estimated accelerator metrics 248, the modeled data transfer metrics 242, and the runtime metrics 220. The offload analyzer 208 can generate one or more heterogeneous programs 268, which are versions of the program 212 that can operate on the heterogeneous target computing system 217. The heterogeneous programs 268 can be written in any programming language that supports program operation on a heterogeneous platform, such as OpenCL, OpenMP, or Data Parallel C++ (DPC++). The code objects for offloading 252 can be included in a recommended offload implementation. A recommended offload implementation can be presented to a user in the form of an offload analysis report, which can be displayed on a display 260 coupled to the host computing system or a different computing system. The display 260 can be integrated into, wired or wirelessly attached to, or accessible over a network by computing system 200. FIGS. 5 and 6 illustrate examples of information that can be displayed on the display 260 as part of an offload analysis report, and will be discussed in greater detail below.

The code object offload selector 264 can automatically select the code objects for offloading 252. In some embodiments, an offload implementation is determined by selecting code objects for offloading if their associated estimated accelerated time is less than their associated host processor unit execution time, or if their associated estimated accelerated time is less than their associated host processor unit execution time by a threshold amount, which could be a speed-up threshold factor, threshold time, etc. An offload analyzer can generate a report for such an offload implementation, cause the report to be displayed on a display, generate a heterogeneous version of the program for this offload implementation, and cause the heterogeneous version to execute on a heterogeneous target computing system.

Figure 3:
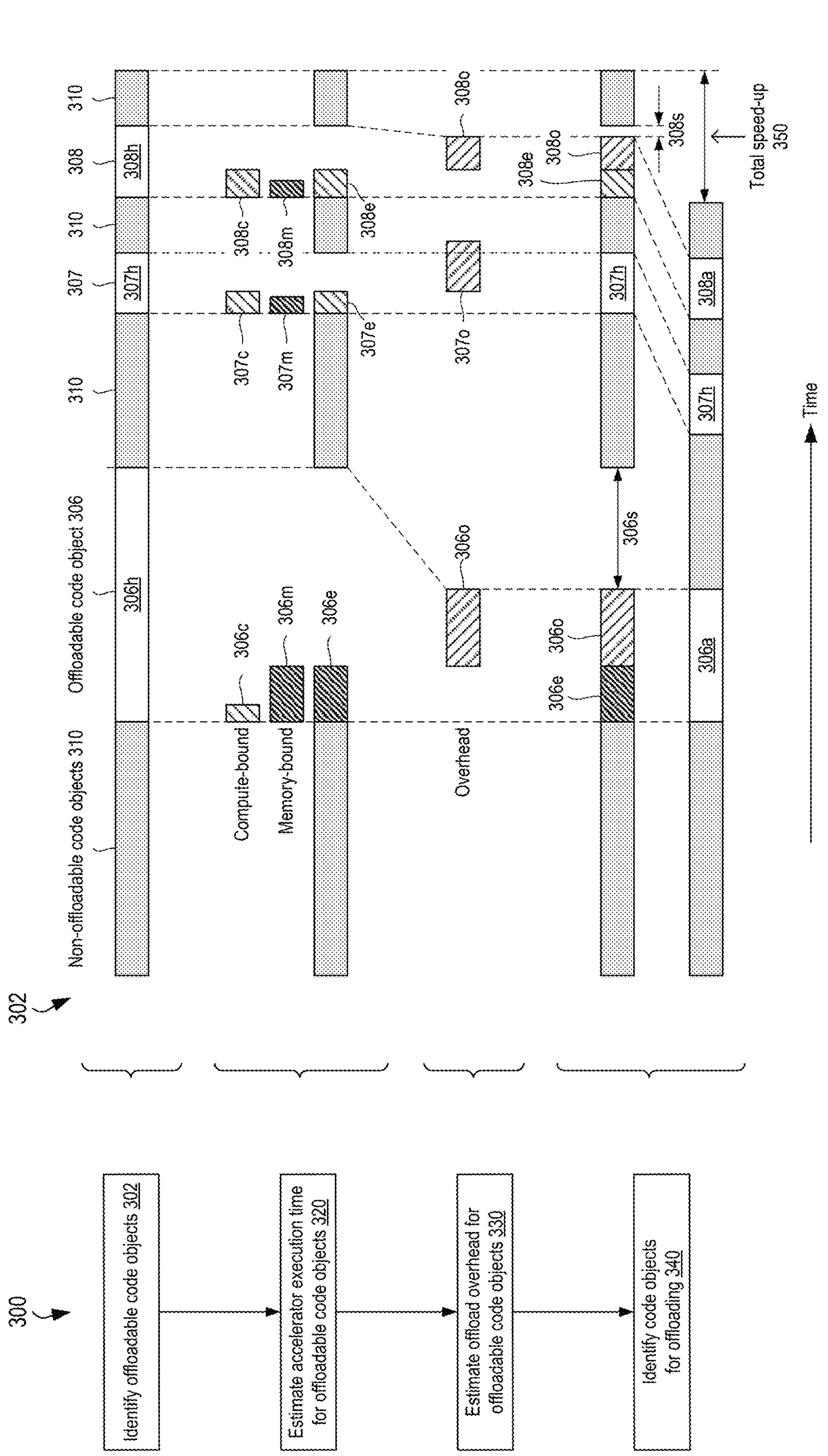
FIG. 3 illustrates an example method for identifying code objects for offloading.

FIG. 3 illustrates an example method for identifying code objects for offloading. The method 300 can be performed by the code object offload selector 264 to select the code objects for offloading 252. The method 300 utilizes the estimated accelerator metrics 248, runtime metrics 220, and modeled accelerator cache metrics 244 to select code objects for offloading. At 302, offloadable code objects 306-308 and non-offloadable code objects 310 are identified from the code objects of the program 212. Identification of offloadable code objects can be performed by the runtime metrics generator 216. Times 302 illustrate host processor unit execution times, estimated accelerator execution times and estimated offload overhead times for the code objects 306-308 and 310. Offloadable code objects 306, 307, and 308 have host processor unit execution times of 306*h*, 307*h*, and 308*h*, respectively. At 320, estimated accelerator execution times for the offloaded code objects 306-308 are determined by taking the maximum of an estimated compute-bound accelerator execution time (306*c*, 307*c*, 308*c*) and a memory-bound accelerator execution time (306*m*, 307*m*, 308*m*). As discussed above, estimated memory-bound accelerator execution times can be determined for multiple levels (e.g., L3, LLC, DRAM) in the memory hierarchy of the target platform for each code object. The estimated memory-bound accelerator execution time illustrated in FIG. 3 for each code object is the maximum of the multiple estimated memory-bound accelerator execution times determined for each code object for various memory hierarchy levels. Thus, 306*m* could represent an estimated memory-bound accelerator execution time corresponding to the L3 cache of a target platform and 307*m* could represent an estimated memory-bound accelerator execution time corresponding to the LLC of the target platform.

For offloadable code object 306, the estimated accelerator execution time 306*e* is set by the estimated memory-bound accelerator execution time 306*m* as 306*m* is greater than the estimated compute-bound estimated accelerator execution time 306*c*. For offloadable code object 307, the estimated accelerator execution time 307*e* is set by the estimated compute-bound accelerator execution time 307*c* as 307*c* is greater than the memory-bound estimated accelerator execution time 307*m*. For offloadable code object 308, the estimated accelerator execution time 308*e* is set to the estimated compute-bound accelerator execution time 308*c* as 308*c* is greater than the memory-bound estimated accelerator execution time 308*m*. Thus, the performance of offloadable code object 306 is estimated to be memory-bound on the accelerator and the performances of offloadable code objects 307 and 308 on the target accelerator are estimated to be compute-bound.

At 330, estimated offload overhead times for the offloadable code objects are determined. The offloadable code objects 306*a*, 307, and 308 are determined to have estimated offload overhead times of 306*o*, 307*o*, and 308*o*, respectively. At 340, code objects for offloading are identified by comparing, for each offloadable code object, its estimated accelerated time (the sum of its estimated offload overhead time and its estimated accelerator execution time) to its host processor unit execution time. If the comparison indicates that offloading the code object would result in a performance improvement, the offloadable code object is identified for offloading. Offloadable code object 306*a* is identified for offloading as its estimated accelerated time 306*e*+306*o* is less than its host processor unit execution time 306*h*, offloadable code object 307 is not identified for offloading as its estimated accelerated time 307*e*+307*o* is more than its host processor unit execution time 307*h*, and offloadable code object 308*a* is identified as a code object for offloading as its estimated accelerated time 308*e*+308*o* is less than its host processor unit execution time 308*h*. The last two rows of 302 illustrate that offloading code objects 306*a* and 308*a* results in estimated speed-ups of 306*s* and 308*s*, respectively, resulting in a total estimated speed-up of 350 for the code objects 306-308 and 310.

In other embodiments of method 300, determining which code objects are offloadable is not performed and the method 300 estimates accelerator execution time and estimated offload overhead times for a plurality of code objects in the program, estimates offload overhead times for the plurality of code objects, and identifies code objects for offloading from the plurality of code objects.

In some embodiments, the code object offload selector 264 selects the code objects for offloading 252 by accounting for the influence that offloading one code object can have on other code objects. For example, data transfer between a host processor unit and a target accelerator may be reduced if code objects sharing data are offloaded to the accelerator, such as multiple loops that share data, even if one of the code objects, in isolation, would execute more quickly on a host processor unit. Simultaneously offloaded loops in configured spatial architectures like FPGAs result in the sharing of accelerator resources, but the cost of sharing resources is offset by the amortization of accelerator configuration time.

As real programs, even comparatively small ones, can have thousands of code objects, an exhaustive search of all possible offload implementations in which the influence of offloading code objects can have on other code objects is accounted for to find the offload implementation that may provide the greatest improvement in performance is infeasible. To simplify the search, the code object offload selector 264 can utilize a dynamic-programming-like bottom-up performance estimate approach on a call tree. The code object offload selector 264 first determines whether code objects in a program execute faster on a host processor unit or an accelerator and then, through traversal of the call tree, determines if any additional code objects are to be selected for offloading to further reduce the execution time of the program.

Figure 4:
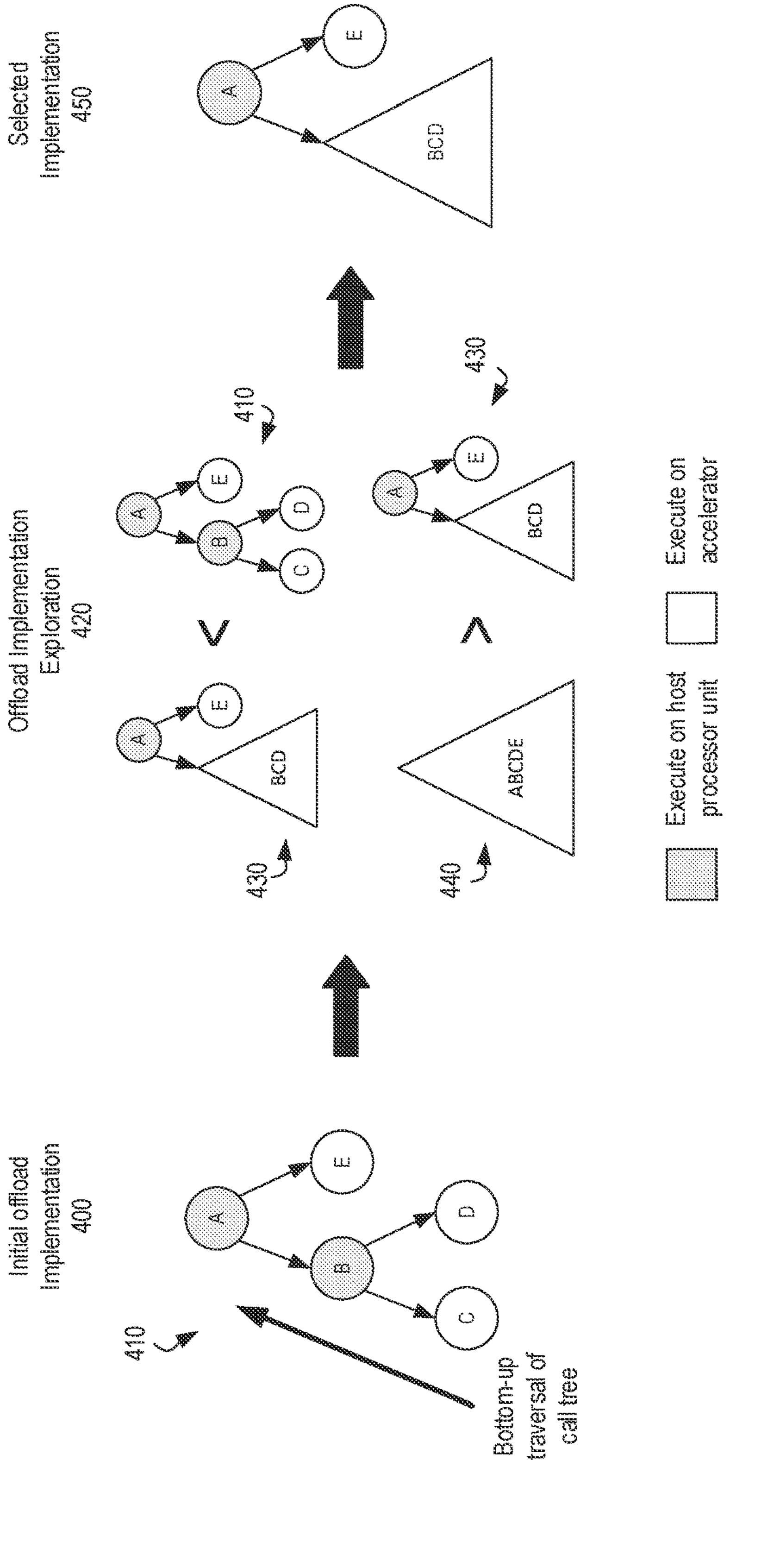
FIG. 4 illustrates an example application of an offload implementation explorer that a code object offload selector can use to identify code objects for offloading.

FIG. 4 illustrates an example application of an offload implementation explorer that the code object offload selector 264 can use to identify code objects for offloading. Call tree 410 represents an initial offload implementation 400 in which code objects A and B have a host processor unit execution time that is less than their estimated accelerated time and have not been selected for offloading and code objects C, D, and E have an estimated accelerated time that is less than their host processor unit execution time and have been selected for offloading. The code object offload selector 264 explores various offload implementations by performing a bottom-up left-to-right traversal of the call tree 410. At each node in the call tree, an offload implementation for the node is selected from one of three options: (1) keeping the code object associated with the parent node on the host processor unit and accepting the offload implementation selected for the children nodes when the children nodes were analyzed as parent nodes, (2) offloading all code objects associated with the parent node and its children nodes, and (3) keeping all code objects associated with the parent node and its children nodes on the host processor unit. This approach can reduce the offload implementation search problem and produces reasonable results as it results in loop nests usually being offloaded together.

The code object offload selector 264 utilizes the objective function of Equation (3) to determine an offload implementation for a region of the program comprising a parent node i in the call tree and its children nodes j.

$$T_i^{exec} = \min\begin{cases} T_i^{host} + \sum_{children} T_j^{\prime overhead} + \sum_{children} T_j^{exec} \\ T_i^{accel} \\ T_i^{host} + \sum_{children} T_j^{host} \end{cases} \quad (3)$$

$$T_i^{exec}$$

is the estimated execution time for the program region anchored at the parent node i in the call tree and is the minimum of three terms. The first term is the estimated execution time of the offload implementation in which the code object associated with the parent node executes on the host processor unit, the code objects associated with the children nodes thus far selected for offload during the call tree traversal are offloaded to the accelerator, and the remaining code objects execute on the host processor unit.

$$T_i^{host}$$

is the host processor unit execution time for the code object associated with the parent node, $$\sum_{children} T_j^{\prime overhead}$$

is the total estimated offload overhead time for the offloaded children code objects, considered as being offloaded together, and $$\sum_{children} T_j^{exec}$$

is the total estimated execution time for children node code objects determined in prior iterations of Eq. (3). Thus, Equation (3) is a recursive equation in that an offload implementation determined for a parent node can depend on the offload implementations determined for its children nodes. The total estimated offload overhead time of the offloaded children node code objects, $$\sum_{children} T_j^{\prime overhead},$$

may be a different value than the sum of the estimated offload overhead times for the offloaded children node code objects if they were considered as being offloaded separately. That is, $$\sum_{children} T_j^{\prime overhead}$$

can be different than $$\sum_{children} T_j^{overhead}, \text{ where } T_j^{\prime overhead}$$

is estimated offload overhead for a code object j when considered as being offloaded with additional code objects in an offload implementation and $$T_j^{overhead}$$

is the offload overhead for a code object j considered separately. The difference in estimated offload overhead times can be due to, for example, data dependencies between the offloaded code objects. As discussed previously, data transfer costs associated with passing data between a code object executing on a host processor unit and an offloaded code object can be saved if the code objects are offloaded together.

The second term, $$T_i^{accel},$$

is the estimated execution time of the offload implementation in which all code objects associated with the parent node i and its children nodes are offloaded. Again, the total estimated offload overhead time for the offloaded code objects may be a different value than the sum of the estimated offload overhead times for the offloaded code objects if they were considered separately. Similarly, the total estimated accelerator execution time for the offloaded code objects may be a different value than the sum of the estimated accelerator execution times for the offloaded code objects if they were considered separately. For example, if a spatial accelerator is large enough to accommodate the implementation of multiple code objects that can operate in parallel, the estimated execution time of the offloaded code objects considered together would be less than the estimated accelerator execution times of the offloaded code objects if considered separately and added together.

The third term, $$T_i^{host} + \sum_{children} T_j^{host},$$

is the estimated execution time of the offload implementation in which all code objects associated with the parent node and its children nodes execute on the host processor unit and is a sum of the host processor unit execution times for the parent and child node code objects as determined by the runtime metrics.

The estimated accelerator execution time for a code object in the call tree traversal approach can be determined using an equation similar to Equation (2). The code object offload selector 264 can determine an estimated accelerator execution time $$T_i^{accel\ exec}$$

for a loop code object i according to Equation (4).

$$T_i^{accel\ exec} = \max\begin{cases} T_i^{Compute} \\ T_i^{Memory_k}\left(M_i^k\right) = \frac{M_i^k}{BW_k} \end{cases} \quad (4)$$

where $$T_i^{Compute}$$

is an estimated compute-bound accelerator execution time for the loop i, $$T_i^{Memory_k}$$

is estimated memory-bound accelerator execution times for multiple levels of the accelerator memory hierarchy, $$M_i^k$$

represents loop memory traffic at the kth level of the memory hierarchy for the loop, and $BW_k$ is the accelerator memory bandwidth at the kth level of the hierarchy. Equation (4) comprehends multiple loop code objects i being offloaded. Thus, $$T_i^{accel\ exec}$$

can be a total estimated accelerator execution time for multiple offloaded loops i, $$T_i^{Compute}$$

can be a total estimated compute-bound accelerator execution time for multiple offloaded loops i and can account for improvements in the total estimated compute-bound accelerator execution time that may occur if the multiple offloaded loops i are offloaded together, instead of separately, as discussed above, and $$T_i^{Memory_k}$$

can be total estimated memory-bound accelerator execution times for multiple levels of the memory hierarchy for multiple offloaded loops i.

The estimated compute-bound accelerator execution time for spatial accelerators or vector accelerators (e.g., GPUs) can be determined using Equations (5) and (6), respectively.

$$T_i^{Compute} = f(uf_i, G_i) \quad (5)$$

$$T_i^{Compute} = f(p, G_i, C) \quad (6)$$

For the spatial accelerator estimated accelerator time, $uf_i$ represents a loop unroll factor, the number of loop instantiations implemented in a spatial accelerator, and $G_i$ represents the loop trip count of the loop. For example, if the runtime metrics for a loop indicate that a loop executes 10 times, $G_i$ would be 10 and, in one offload implementation, $uf_i$ could be set to 2, indicating that two instantiations of the loop are implemented in the spatial accelerator and that each implemented loop instance will iterate five times when executed. In some embodiments, $uf_i$ can be varied for a loop and the estimated compute-bound accelerator execution time of the loop can be the minimum estimated compute-bound loop accelerator execution time for the different loop unroll factors considered, according to Equation (7).

$$T_i^{Compute} = \min_{U=\{uf_1, uf_2, \dots\}} (f(uf_i, G_i)) \quad (7)$$

The number of instantiations of a loop on a spatial accelerator can be limited by, for example, the relative sizes of the loop and the spatial accelerator and loop data dependencies. Continuing with the previous example, estimated compute-bound accelerator execution times could be determined for the loop with a $G_i$ of 10 with $uf_i$ values of 1, 2, 4, and 5, and the $uf_i$ resulting in the lowest estimated compute-bound accelerator execution time would be selected as the loop unroll factor for the loop.

In some embodiments, the code object offload selector 264 can consider various offload implementations for a call tree node in which loop unroll factors for a loop associated with a parent node and loops associated with children nodes are simultaneously varied to determine an offload implementation. That is, various loop unroll factors for the parent and children node loops that distribute spatial accelerator resources among parent and child node loop instantiations can be examined and the combination of loop unroll factors for the parent and child node loops that result in the lowest estimated compute-bound accelerator execution time for the parent and children loops considered collectively is selected as part of the offload implementation for the node. For each offloaded loop, the code objects for offloading 252 can comprise the loop unroll factor.

For the estimated acceleration execution time for vector accelerators, Equation (6), p indicates the number of threads or work items that an accelerator can execute in parallel, C indicates the compute throughput of the accelerator, and $G_i$ represents the loop trip count.

While Equations (4) through (7) and their corresponding discussion pertain to determining the estimated acceleration execution time for a loop, similar equations can be used to determine the estimated accelerator execution time for other code objects, such as functions.

Returning to FIG. 4, in an offload implementation exploration stage 420, for node B in the call tree 410, the explorer determines that an estimated accelerated time of an offload implementation for the program region comprising nodes B, C, D (parent node B and its children nodes C and D) in which the code objects associated with nodes B, C, and D are offloaded together (call tree 430) is less than an estimated accelerated time of the program region if the code object associated with node B is executed on the host processor unit and the code objects associated with nodes C and D are offloaded (call tree 410), even though code object B would not be offloaded if code object B were considered for offloading separately. The code object offload selector 264 adds the code object associated with node B to the code objects for offloading 252.

Moving up the call tree, the explorer determines that an estimated accelerated time of an offload implementation for the program region comprising the code object associated with node A and its children nodes B, C, D, and E offloaded (call tree 440), with the code objects associated with nodes A-E considered as being offloaded together, is greater than an estimated accelerated time of the offload implementation represented by the call tree 430 and does not select the code object associated with node A for offloading. Having reached the root node, the explorer considers no further offload implementations and selects the offload implementation 430 as the offload implementation 450 providing the lowest estimated accelerated time for the program.

After a call tree has been fully traversed, the offload analyzer can determine an execution time for a heterogeneous version of the program that implements the resulting offload implementation. The execution time for the heterogeneous program can be the estimated execution time of the root node of the call tree. The execution time of the heterogeneous program can be included in an offload analysis report. The offload analyzer 208 can generate a heterogeneous program 268 in which the code objects for offloading 252 as determined by the call tree traversal are to be offloaded to an accelerator.

An offload analyzer 208 can comprise or have access to accelerator models 232, accelerator cache models 236, and data transfer models 238 for different accelerators, allowing a user to explore the performance benefits of porting a program 212 to various heterogeneous target computing systems.

The offload analyzer 208 can generate multiple offload implementations for porting a program 212 to the target computing system 217. To have the offload analyzer 208 generate different offload implementations for the program 212, a user can, for example, change the value of one or more accelerator characteristic specified in the accelerator configuration information 254, alter the threshold criteria used by the code object offload selector 264 to automatically identify code objects for offloading, or provide input to the offload analyzer 208 indicating that specific code objects are or are not to be offloaded. For each offload implementation, the offload analyzer 208 can generate a report and cause the report to be displayed on the display 260 and/or generate a heterogeneous program 268 for operating on a target platform. Generated heterogeneous programs can be stored in a database for future use, which can be re-referenced for multiple offload analyses, whether for the same or different accelerators, without needing to regenerate the runtime metrics for each analysis. In some embodiments, the offload analyzer 208 can cause a generated heterogeneous program 268 to execute on the target computing system 217.

The offload analyzer 208 can cause an offload analysis report to be displayed on the display 260. The report can comprise one or more runtime metrics 220, modeled data transfer metrics 242, modeled accelerator cache metrics 244, and estimated accelerator metrics 248. The report can further comprise one or more of the code objects selected for offloading 252 and one or more code object not selected for offloading. For a code object not selected for offloading, the report can comprise a statement indicating why offloading the code object is not profitable, such as parallel execution efficiency being limited due to dependencies, too high of an offload overhead, high computation time despite full use of target platform capabilities, the number of loop iterations not being enough to fully utilize target platform capabilities, or the data transfer time being greater than the estimated compute-bound accelerator execution time and the estimated memory-bound accelerator execution time. These statements can aid a programmer by pointing out which code objects are not attractive candidates for offloading and potentially pointing out how to alter the code objects to make them more attractive for offloading.

FIG. 5 shows an example offload analysis report. For a program under analysis, the report 500 comprises program metrics 502, bounded-by metrics 504, accelerator configuration information 506, top offloaded code objects 508, and top non-offloaded code objects 510. The program metrics 502 comprise a host processor unit execution time for the program 512, an estimated execution time for a heterogeneous version of the program executing on a target platform utilizing the offload implementation strategy detailed in the report 500, an estimated accelerated time of the program 520, the number of offloaded code objects 524, program speed-up factors 525 and 526, and other metrics 528. The speed-up factor 525 indicates a collective amount of speed-up for the offloaded code objects and the speed-up factor 526 indicates an amount of program-level speed-up calculated using Amdahl's Law, which accounts for the frequency that code objects run during program execution. Calculation of the Amdahl's law-based speed-up factor 526 can utilize runtime metrics that indicate the frequency of code object execution, such as loop and function call frequency. The host processor unit execution time for the program 512 can be one of the runtime metrics generated by the offload analyzer and metrics 516, 520, 524, and 528 can be estimated accelerator metrics generated by the offload analyzer.

The bounded-by metrics 504 comprise a percentage of code objects in the program not offloaded 532, and percentages of offloaded code objects whose offloaded performance is bounded by a particular limiting factor 536 (e.g., compute, L3 cache bandwidth, LLC bandwidth, memory bandwidth, data transfer, dependency, trip count). The bounded-by metrics 504 can be part of the estimated accelerator metrics generated by the offload analyzer.

The accelerator configuration information 506 comprises information indicating the configuration of the target accelerator (an Intel® Gen9 GT4 GPU) for the reported offload analysis. The accelerator configuration information 506 comprises an accelerator operational frequency 538, an L3 cache size 540, an L3 cache bandwidth 544, a DRAM bandwidth 548, and an indication 552 of whether the accelerator is integrated into the same integrated circuit component as the host processor unit. Sliding bar user interface (UI) elements 560 allow a user to adjust the accelerator configuration settings and a refresh UI element 556 allows a user to rerun the offload analysis with new configuration settings. Thus, the UI elements 560 in the report 500 are one way that accelerator configuration information can be provided to an offload analyzer.

The top offloaded code objects 508 comprise one or more of the code objects selected for offloading for the reported offload implementation. For each offloaded code object included in the report, the report 500 includes a code object identifier 562, an estimated speed-up factor 564, an estimated amount of data transfer between the host processor unit and the accelerator 568, the host processor unit execution time 572, accelerated time 574, a graphical comparison

576 of the host processor unit execution, an estimated compute-bound accelerator execution time, various estimated memory-bound accelerator execution times, and an estimated offload overhead time, and the target platform constraint 580 limiting the performance of the offloaded code object. The metrics 564, 568, 572, 574, and 580 can be included in the estimated accelerator metrics generated by the offload analyzer. The top non-offloaded code objects 510 comprise one or more of the code objects that have not been selected for offload. For each code object not selected for offloading included in the report 500, the report 500 includes a code object identifier 562 and a statement 584 indicating why the non-offloaded code object was not selected for offloading. Various examples of statements 584 include parallel execution efficiency being limited due to dependencies, too high of an offload overhead, high computation time despite full use of target platform capabilities, the number of loop iterations not being enough to fully utilize target platform capabilities, or the data transfer time being greater than the estimated compute-bound accelerator execution time and the estimated memory-bound accelerator execution time. These statements can aid a programmer by pointing out which code objects are not attractive candidates for offloading and potentially pointing out how to alter the code objects to make them more attractive for offloading. FIG. 5 shows just one possible report that can be provided by an offload analyzer. More, less, or different information can be provided in other embodiments.

FIG. 6 shows a graphical representation of an offload implementation. The recommendation comprises a program call tree 610 that is marked up to identify the code objects selected for offloading. The offload analyzer can cause the marked-up call tree 610 to be displayed on a display as part of an offload analyzer report. Code objects selected for offloading 620 are represented by their corresponding node surrounded by a grey box and code objects not selected for offloading 630 are not marked in grey.

The offload analyzer 208 can perform an offload analysis for the program 212 based on runtime metrics generated by executing the program 212 on a computer system other than the one on which the offload analyzer 208 is running. For example, the offload analyzer 208 can cause the program 212 to execute on an additional host computing system 290 comprising an additional host processor unit 292 to generate the runtime metrics 220. Further, the offload analyzer 208 can allow a user to explore estimated performance improvements for the program 212 executing on different host processor units. For example, the offload analyzer 208 can perform a first offload analysis for the program 212 being offloaded from the host processor unit 204 and a second offload analysis for the program 212 being offloaded from the additional host processor unit 292, with the host processor unit 204 and the additional host processor unit 292 being different processor unit types.

Similarly, as discussed previously, the offload analyzer 208 can perform different offload analyses for a program 212 using different types of accelerators and accelerator configurations. If a target computing system 217 comprises multiple accelerators 224, the offload analyzer 208 can perform an offload analysis for any one of the multiple accelerators 224. As the offload analyzer 208 can utilize the runtime metrics 220 generated from prior runs, the runtime metrics 220 may need only be generated once for a program 212 executing on a particular host processor unit. The offload analyzer 208 can perform a first offload analysis for a first accelerator using a first accelerator model 232, a first accelerator cache model 236, and a first data transfer model 238 and a second offload analysis for a second accelerator using a second accelerator model 232, a second accelerator cache model 236, and a second data transfer model 238. An offload analyzer can also be used to predict the performance of a program on a future accelerator or target computing system as long as an accelerator model, accelerator cache model, and data transfer model are available. This can aid accelerator and SoC architects and designers in designing accelerators and SoC that provide increased accelerator performance for existing programs and aid program developers in developing programs that can take advantage of future accelerator and heterogeneous platform features. Thus, the offload analyzer 208 provides the ability for a user to readily explore possible performance improvements of a program using various types of accelerators and accelerator configurations.

In embodiments where the target computing system 217 comprises multiple accelerators 224, the offload analyzer 208 can simultaneously analyze offloading code objects to two or more accelerators 224. For example, the offload analyzer 208 can comprise an accelerator model 232, an accelerator cache model 236, and a data transfer model 238 for the individual accelerators 224. For an individual accelerator 224, an accelerator model 232 can generate estimated accelerator metrics 248 based on the runtime metrics 220, modeled accelerator cache metrics 244 generated by an accelerator cache model 236 modeling the cache memory of the individual accelerator, and modeled data transfer metrics 242 generated by a data transfer model 238 modeling data transfer characteristics for the individual accelerator. The accelerator models 232 for the multiple accelerators 224 can collectively generate the estimated accelerator metrics 248, which can comprise metrics estimating the performance of code objects offloaded to one or more of the multiple accelerators 224. For example, the estimated accelerator metrics 248 can comprise an estimated accelerated time for a code object for multiple accelerators. The multiple accelerator models 232 can use modeled accelerator cache metrics 244 generated by the same accelerator cache model 236 if the multiple accelerators 224 use the same cache memories and the multiple accelerator models 232 can use modeled data transfer metrics 242 generated by the same data transfer model 238 if the multiple accelerators 224 have the same data transfer characteristics. In an offload analysis in which multiple accelerators are considered for offloading, the code objects for offloading 252 can comprise information indicating which of the multiple accelerators 224 to which code object is to be offloaded.

The bottom-up traversal of a call tree to determine if offloading additional code objects would result in further program performance improvements can be similarly expanded for multiple accelerator offload analyses. For example, when considering various offload implementations for an individual node in the call tree, the estimated accelerated times of the code objects of the parent node and its children nodes if they were offloaded together to each of the multiple accelerators 224 are considered. Thus, determining an offload implementation for a node in the call tree could result in the selection of an offload implementation in which code objects associated with a parent node and its children nodes all being offloaded to any one of the multiple accelerators. A report for an offload analysis in which multiple accelerators are considered can comprise program metrics, bounded-by metrics, top offloaded code object metrics, etc. for code objects offloaded to various of the multiple accelerators 224, along with accelerator configuration information for the multiple accelerators 224. The accelerator configuration information 254 can comprise information for multiple accelerators.

In some embodiments, the runtime metrics generator 216, the data transfer model 238, the accelerator cache model 236, the accelerator model 232, and/or the code object offload selector 264 can be implemented as modules (e.g., runtime metrics generator module, data transfer model module, accelerator cache model module, accelerator model module, code object offload selector module). It is to be understood that the components of the offload analyzer illustrated in FIG. 2 are one illustration of a set of components that can be included in an offload analyzer. In other embodiments, an offload analyzer can have more or fewer components than those shown in FIG. 2. Further, separate components can be combined into a single component, and a single component can be split into multiple components. For example, the data transfer model 238, the accelerator cache model 236, and the accelerator model 232 can be combined into a single accelerator model component.

Figure 7:
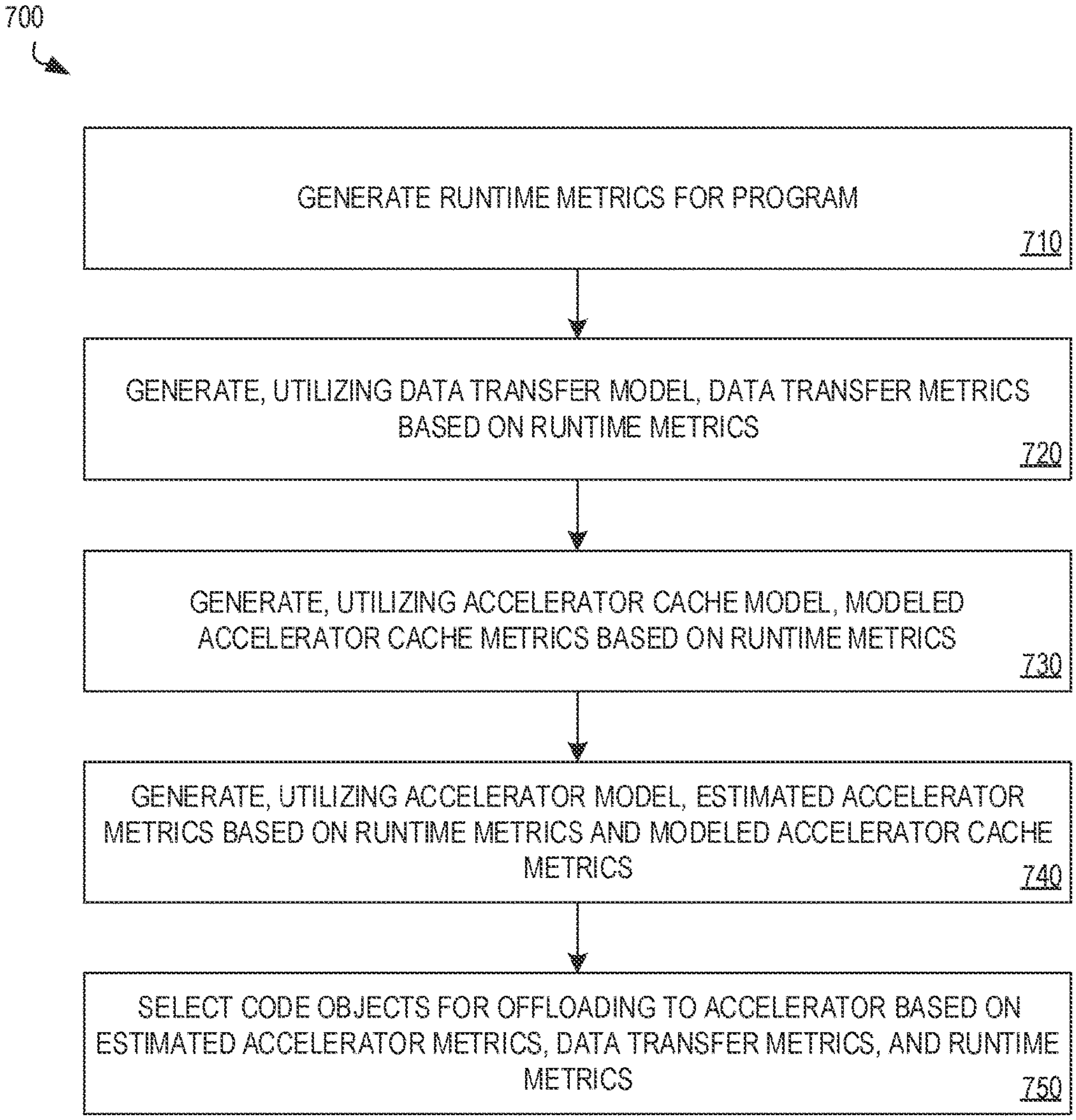
FIG. 7 is an example method for selecting code objects for offloading.

FIG. 7 is an example method for selecting code objects for offloading. The method 700 can be performed by, for example, an offload analyzer operating on a server. At 710, runtime metrics for a program comprising a plurality of code objects are generated, the runtime metrics reflecting performance of the program executing on a host processor unit. At 720, modeled accelerator cache metrics are generated utilizing an accelerator cache model and based on the runtime metrics. At 730, data transfer metrics are generated, utilizing a data transfer model, based on the runtime metrics. At 740, estimated accelerator metrics are generated, utilizing an accelerator model, based on the runtime metrics and the modeled accelerator cache metrics. At 750, one or more code objects are selected for offloading to an accelerator based on the estimated accelerator metrics, the data transfer metrics, and the runtime metrics.

In other embodiments, the method 700 can comprise one or more additional elements. For example, the method 700 can further comprise generating a heterogeneous version of the program that, when executed on a heterogeneous computing system comprising a target accelerator, offloads the code objects selected for offloading to the target accelerator. In another example, the method 700 can further comprise causing the heterogeneous version of the program to be executed on the target computing system.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

Figure 8:
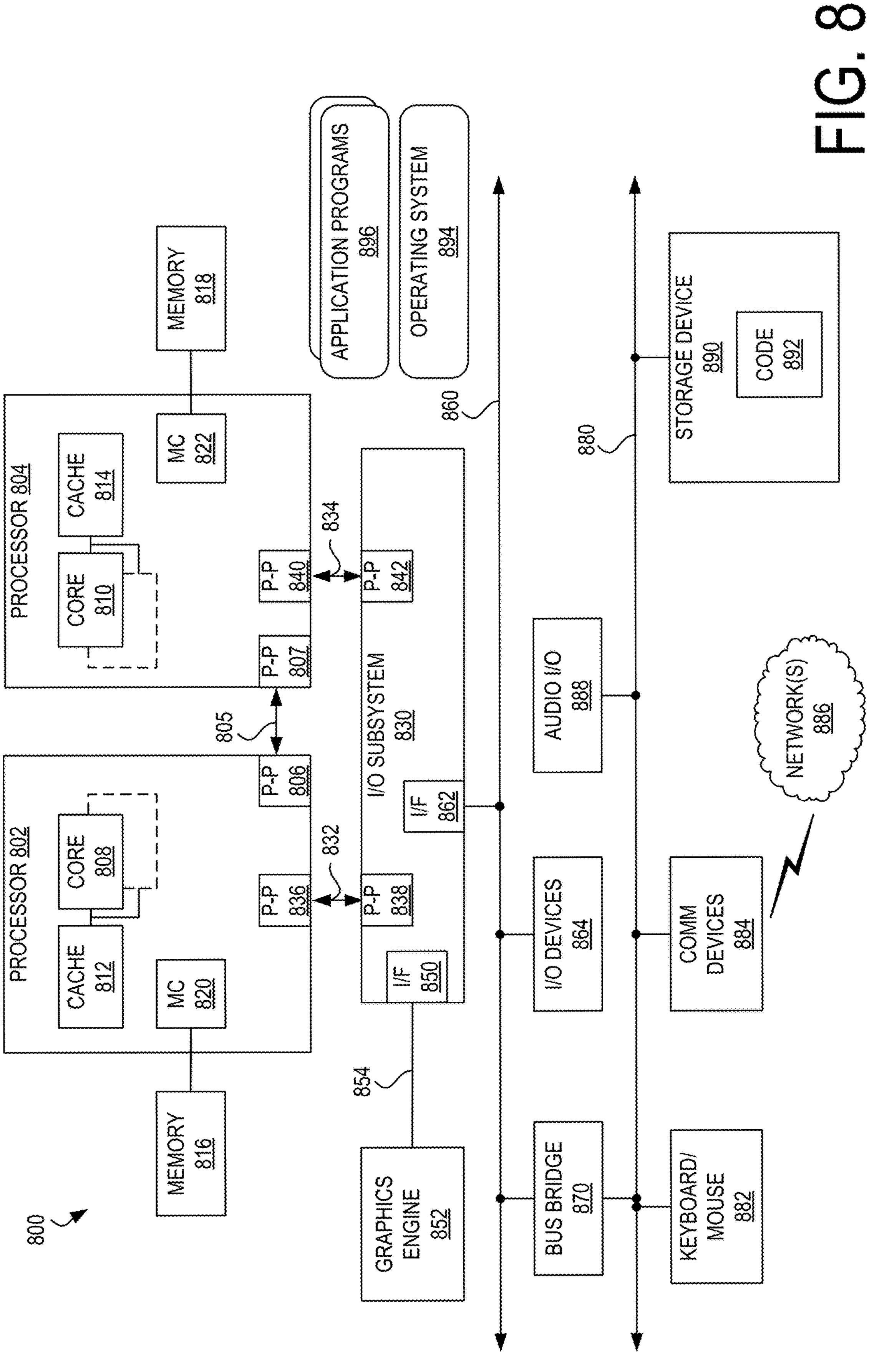
FIG. 8 is a block diagram of an example computing system in which technologies described herein may be implemented.

FIG. 8 is a block diagram of an example computing system in which technologies described herein may be implemented. Generally, components shown in FIG. 8 can communicate with other shown components, although not all connections are shown, for ease of illustration. The computing system 800 is a multiprocessor system comprising a first processor unit 802 and a second processor unit 804 comprising point-to-point (P-P) interconnects. A point-to-point (P-P) interface 806 of the processor unit 802 is coupled to a point-to-point interface 807 of the processor unit 804 via a point-to-point interconnection 805. It is to be understood that any or all of the point-to-point interconnects illustrated in FIG. 8 can be alternatively implemented as a multi-drop bus, and that any or all buses illustrated in FIG. 8 could be replaced by point-to-point interconnects.

The processor units 802 and 804 comprise multiple processor cores. Processor unit 802 comprises processor cores 808 and processor unit 804 comprises processor cores 810. Processor cores 808 and 810 can execute computer-executable instructions in a manner similar to that discussed below in connection with FIG. 9, or other manners.

Processor units 802 and 804 further comprise cache memories 812 and 814, respectively. The cache memories 812 and 814 can store data (e.g., instructions) utilized by one or more components of the processor units 802 and 804, such as the processor cores 808 and 810. The cache memories 812 and 814 can be part of a memory hierarchy for the computing system 800. For example, the cache memories 812 can locally store data that is also stored in a memory 816 to allow for faster access to the data by the processor unit 802. In some embodiments, the cache memories 812 and 814 can comprise multiple cache levels, such as level 1 (L1), level 2 (L2), level 3 (L3), level 4 (L4) and/or other caches or cache levels. In some embodiments, one or more levels of cache memory (e.g., L2, L3, L4) can be shared among multiple cores in a processor unit or multiple processor units in an integrated circuit component. In some embodiments, the last level of cache memory on an integrated circuit component can be referred to as a last level cache (LLC). One or more of the higher levels of cache levels (the smaller and faster caches) in the memory hierarchy can be located on the same integrated circuit die as a processor core and one or more of the lower cache levels (the larger and slower caches) can be located on integrated circuit dies that are physically separate from the processor core integrated circuit dies.

Although the computing system 800 is shown with two processor units, the computing system 800 can comprise any number of processor units. Further, a processor unit can comprise any number of processor cores. A processor unit can take various forms such as a central processor unit (CPU), a graphics processor unit (GPU), general-purpose GPU (GPGPU), accelerated processor unit (APU), field-programmable gate array (FPGA), neural network processor unit (NPU), data processor unit (DPU), accelerator (e.g., graphics accelerator, digital signal processor (DSP), compression accelerator, artificial intelligence (AI) accelerator), controller, or other types of processor units. As such, the processor unit can be referred to as an XPU (or xPU). Further, a processor unit can comprise one or more of these various types of processor units. In some embodiments, the computing system comprises one processor unit with multiple cores, and in other embodiments, the computing system comprises a single processor unit with a single core. As used herein, the terms "processor" and "processor unit" can refer to any processor, processor core, component, module, engine, circuitry, or any other processing element described or referenced herein.

In some embodiments, the computing system 800 can comprise one or more processor units that are heterogeneous or asymmetric to another processor unit in the computing system. There can be a variety of differences between the processor units in a system in terms of a spectrum of metrics of merit including architectural, microarchitectural, thermal, power consumption characteristics, and the like. These differences can effectively manifest themselves as asymmetry and heterogeneity among the processor units in a system. In some embodiments, the computing system 800 can comprise a host processor unit and an accelerator.

The processor units 802 and 804 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetry can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 802 and 804 further comprise memory controller logic (MC) 820 and 822. As shown in FIG. 8, MCs 820 and 822 control memories 816 and 818 coupled to the processor units 802 and 804, respectively. The memories 816 and 818 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 820 and 822 are illustrated as being integrated into the processor units 802 and 804, in alternative embodiments, the MCs can be external to a processor unit.

Processor units 802 and 804 are coupled to an Input/Output (I/O) subsystem 830 via point-to-point interconnections 832 and 834. The point-to-point interconnection 832 connects a point-to-point interface 836 of the processor unit 802 with a point-to-point interface 838 of the I/O subsystem 830, and the point-to-point interconnection 834 connects a point-to-point interface 840 of the processor unit 804 with a point-to-point interface 842 of the I/O subsystem 830. Input/Output subsystem 830 further includes an interface 850 to couple the I/O subsystem 830 to a graphics engine 852. The I/O subsystem 830 and the graphics engine 852 are coupled via a bus 854.

The Input/Output subsystem 830 is further coupled to a first bus 860 via an interface 862. The first bus 860 can be a Peripheral Component Interconnect Express (PCIe) bus or any other type of bus. Various I/O devices 864 can be coupled to the first bus 860. A bus bridge 870 can couple the first bus 860 to a second bus 880. In some embodiments, the second bus 880 can be a low pin count (LPC) bus. Various devices can be coupled to the second bus 880 including, for example, a keyboard/mouse 882, audio I/O devices 888, and a storage device 890, such as a hard disk drive, solid-state drive, or another storage device for storing computer-executable instructions (code) 892 or data. The code 892 can comprise computer-executable instructions for performing methods described herein. Additional components that can be coupled to the second bus 880 include communication device(s) 884, which can provide for communication between the computing system 800 and one or more wired or wireless networks 886 (e.g., Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 884 support wireless communication, the communication devices 884 can comprise wireless communication components coupled to one or more antennas to support communication between the computing system 800 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 800 can comprise removable memory such as flash memory cards (e.g., SD (Secure Digital) cards, memory sticks, Subscriber Identity Module (SIM) cards). The memory in system 800 (including caches 812 and 814, memories 816 and 818, and storage device 890) can store data and/or computer-executable instructions for executing an operating system 894 and application programs 896. Example data includes web pages, text messages, images, sound files, and video data to be sent to and/or received from one or more network servers or other devices by the system 800 via the one or more wired or wireless networks 886, or for use by the system 800. The system 800 can also have access to external memory or storage (not shown) such as external hard drives or cloud-based storage.

The operating system 894 can control the allocation and usage of the components illustrated in FIG. 8 and support the one or more application programs 896. The application programs 896 can include common computing system applications (e.g., email applications, calendars, contact managers, web browsers, messaging applications) as well as other applications, such as an offload analyzer.

In some embodiments, a hypervisor (or virtual machine manager) operates on the operating system 894 and the application programs 896 operate within one or more virtual machines operating on the hypervisor. In these embodiments, the hypervisor is a type-2 or hosted hypervisor as it is running on the operating system 894. In other hypervisor-based embodiments, the hypervisor is a type-1 or "bare-metal" hypervisor that runs directly on the platform resources of the computing system 800 without an intervening operating system layer.

In some embodiments, the applications 896 can operate within one or more containers. A container is a running instance of a container image, which is a package of binary images for one or more of the applications 896 and any libraries, configuration settings, and any other information that one or more applications 896 need for execution. A container image can conform to any container image format, such as Docker®, Appc, or LXC container image formats. In container-based embodiments, a container runtime engine, such as Docker Engine, LXC, or an open container initiative (OCI)-compatible container runtime (e.g., Railcar, CRI-O) operates on the operating system (or virtual machine monitor) to provide an interface between the containers and the operating system 894. An orchestrator can be responsible for management of the computing system 800 and various container-related tasks such as deploying container images to the computing system 800, monitoring the performance of deployed containers, and monitoring the utilization of the resources of the computing system 800.

The computing system 800 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 800. External input and output devices can communicate with the system 800 via wired or wireless connections.

In addition, the computing system 800 can provide one or more natural user interfaces (NUIs). For example, the operating system 894 or applications 896 can comprise speech recognition logic as part of a voice user interface that allows a user to operate the system 800 via voice commands. Further, the computing system 800 can comprise input devices and logic that allows a user to interact with the computing system 800 via body, hand or face gestures.

The system 800 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 800 can further comprise one or more additional antennas coupled to one or more additional receivers, transmitters, and/or transceivers to enable additional functions.

In addition to those already discussed, integrated circuit components, and other components in the computing system 800 can communicate with interconnect technologies such as Intel® QuickPath Interconnect (QPI), Intel® Ultra Path Interconnect (UPI), Compute Express Link (CXL), cache coherent interconnect for accelerators (CCIX®), serializer/deserializer (SERDES), Nvidia® NVLink, ARM Infinity Link, Gen-Z, or Open Coherent Accelerator Processor Interface (OpenCAPI). Other interconnect technologies may be used and a computing system 800 may utilize one or more interconnect technologies.

It is to be understood that FIG. 8 illustrates only one example computing system architecture. Computing systems based on alternative architectures can be used to implement technologies described herein. For example, instead of the processors 802 and 804 and the graphics engine 852 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 8. Moreover, the illustrated components in FIG. 8 are not required or all-inclusive, as shown components can be removed and other components added in alternative embodiments.

Figure 9:
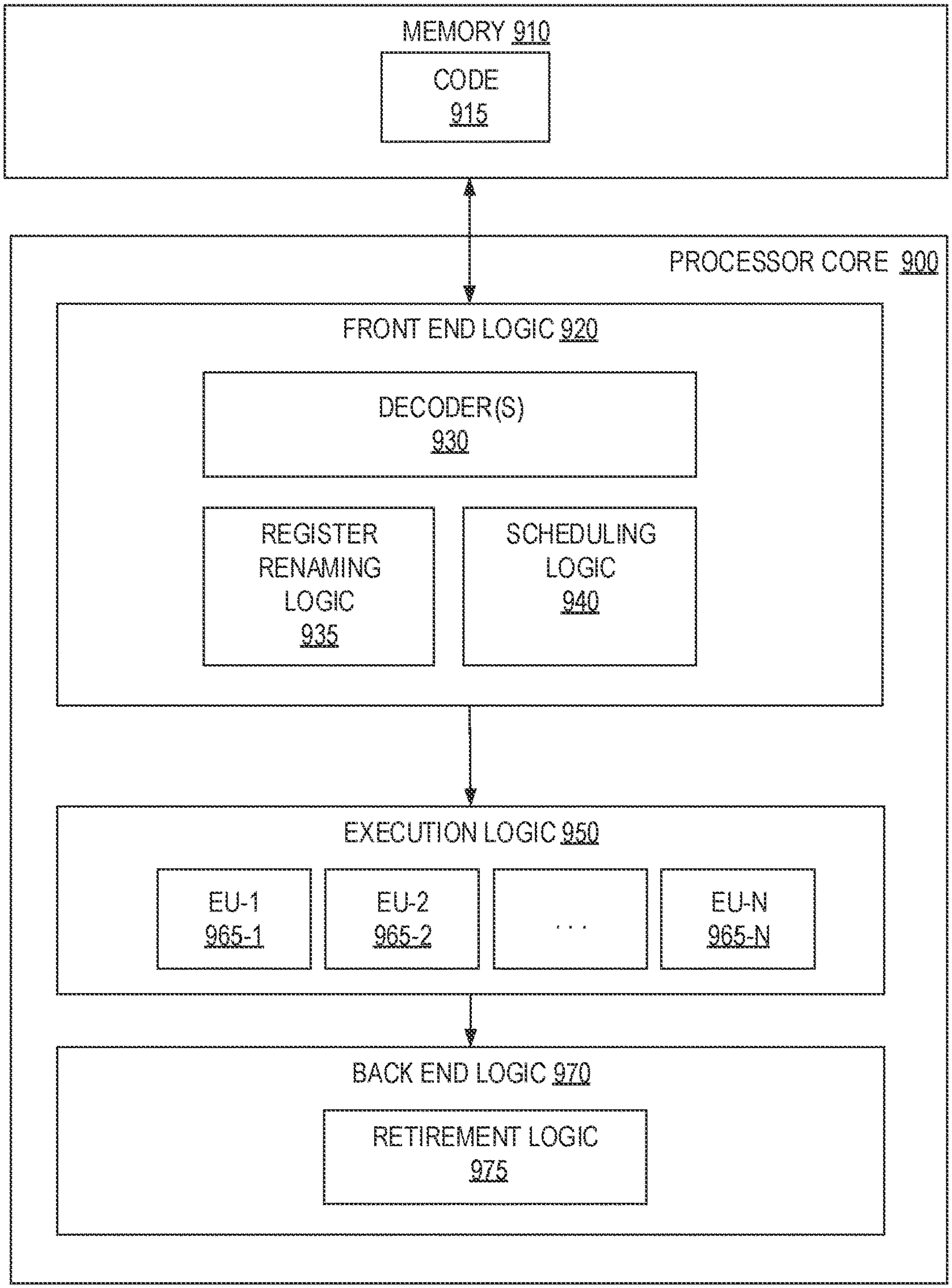
FIG. 9 is a block diagram of an example processor unit that can execute instructions as part of implementing technologies described herein.

FIG. 9 is a block diagram of an example processor unit 900 that can execute instructions as part of implementing technologies described herein. The processor unit 900 can be a single-threaded core or a multithreaded core in that it may include more than one hardware thread context (or "logical processor") per processor unit.

FIG. 9 also illustrates a memory 910 coupled to the processor unit 900. The memory 910 can be any memory described herein or any other memory known to those of skill in the art. The memory 910 can store computer-executable instructions 915 (code) executable by the processor core 900.

The processor unit comprises front-end logic 920 that receives instructions from the memory 910. An instruction can be processed by one or more decoders 930. The decoder 930 can generate as its output a micro-operation such as a fixed width micro-operation in a predefined format, or generate other instructions, microinstructions, or control signals, which reflect the original code instruction. The front-end logic 920 further comprises register renaming logic 935 and scheduling logic 940, which generally allocate resources and queue operations corresponding to converting an instruction for execution.

The processor unit 900 further comprises execution logic 950, which comprises one or more execution units (EUs) 965-1 through 965-N. Some processor unit embodiments can include a number of execution units dedicated to specific functions or sets of functions. Other embodiments can include only one execution unit or one execution unit that can perform a particular function. The execution logic 950 performs the operations specified by code instructions. After completion of execution of the operations specified by the code instructions, back-end logic 970 retires instructions using retirement logic 975. In some embodiments, the processor unit 900 allows out of order execution but requires in-order retirement of instructions. Retirement logic 975 can take a variety of forms as known to those of skill in the art (e.g., re-order buffers or the like).

The processor unit 900 is transformed during execution of instructions, at least in terms of the output generated by the decoder 930, hardware registers and tables utilized by the register renaming logic 935, and any registers (not shown) modified by the execution logic 950.

As used herein, the term "module" refers to logic that may be implemented in a hardware component or device, software or firmware running on a processor unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processor units, state machine circuitry, and/or firmware that stores instructions executable by programmable circuitry. Modules described herein may, collectively or individually, be embodied as circuitry that forms a part of a computing system. Thus, any of the modules can be implemented as circuitry, such as accelerator model circuitry, code object offload selector circuitry, etc. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system, device, or machine described or mentioned herein as well as any other computing system, device, or machine capable of executing instructions. Thus, the term "computer-executable instruction" refers to instructions that can be executed by any computing system, device, or machine described or mentioned herein as well as any other computing system, device, or machine capable of executing instructions.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory), optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion thereof) may be performed by hardware components comprising non-programmable circuitry. In some embodiments, any of the methods herein can be performed by a combination of non-programmable hardware components and one or more processor units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method, comprising: generating runtime metrics for a program comprising a plurality of code objects, the runtime metrics indicating performance of the program executing on a host processor unit; generating, utilizing an accelerator cache model, modeled accelerator cache metrics based on the runtime metrics; generating, utilizing a data transfer model, modeled data transfer metrics based on the runtime metrics; generating, utilizing an accelerator model, estimated accelerator metrics based on the runtime metrics and the modeled accelerator cache metrics; and selecting one or more code objects for offloading to an accelerator based on the estimated accelerator metrics, the modeled data transfer metrics, and the runtime metrics.

Example 2 is the method of Example 1, wherein the generating the runtime metrics comprises: causing the program to execute on the host processor unit; and receiving program performance information generated during execution of the program on the host processor unit, the runtime metrics comprising at least a portion of the program performance information.

Example 3 is the method of Example 2, wherein the runtime metrics further comprise information derived from the program performance information.

Example 4 is the method of Example 2, wherein a first computing system performs the generating the estimated accelerator metrics and the host processor unit is part of a second computing system.

Example 5 is the method of any one of Examples 1-4, wherein the generating the estimated accelerator metrics comprises, for individual of the code objects, determining an estimated accelerated time.

Example 6 is the method of Example 5, wherein the generating the estimated accelerator metrics further comprises, for individual of the code objects, determining an estimated acceleration execution time and an estimated offload overhead time, wherein the estimated accelerated time is the estimated acceleration execution time plus the estimated offload overhead time.

Example 7 is the method of Example 6, wherein the determining the estimated accelerator execution time for individual of the code objects comprises: determining an estimated compute-bound accelerator execution time for the individual code object based on one or more of the runtime metrics; determining one or more estimated memory-bound accelerator execution times for the individual code object based on one or more of the modeled accelerator cache metrics, individual of the estimated memory-bound accelerator execution times corresponding to a memory hierarchy level of a memory hierarchy available to the accelerator; and selecting the maximum of the estimated compute-bound accelerator execution time and the estimated memory-bound accelerator execution times as the estimated accelerator execution time for the individual code object.

Example 8 is the method of Example 7, wherein the determining the estimated compute-bound accelerator execution time comprises, for the individual code objects that are loops: determining a plurality of estimated compute-bound loop accelerator execution times for the individual code object, individual of the estimated compute-bound loop accelerator execution times based on a loop unroll factor from a plurality of different loop unroll factors; and setting the estimated compute-bound accelerator execution time for the individual code object to the minimum of the estimated compute-bound loop accelerator execution times.

Example 9 is the method of Example 6, wherein the determining the estimated offload overhead time for the individual code object is based on a kernel launch time.

Example 10 is the method of Example 6, wherein the determining the estimated offload overhead time for the individual code object is based on one or more of the modeled data transfer metrics associated with the individual code object.

Example 11 is the method of Example 5, wherein the runtime metrics comprise a host processor unit execution time for individual of the code objects, the selecting the one or more code objects for offloading comprising selecting as the code objects for offloading those code objects for which the estimated accelerated time is less than the host processor unit execution time.

Example 12 is the method of Example 5, wherein the runtime metrics comprise a host processor unit execution time for individual of the code objects, the selecting the code objects for offloading comprising performing a bottom-up traversal of a call tree of the program, individual nodes of the call tree corresponding to one of the code objects, for individual nodes in the call tree reached during the bottom-up traversal: (i) determining a first estimated execution time, the first estimated execution time a sum of a total estimated offload overhead time for the code objects associated with the individual node and children nodes of the individual node being considered as offloaded together, and a total estimated accelerator execution time for the code objects associated with the individual node and the children nodes of the individual being considered as offloaded together; (ii) summing the host processor unit execution times for the code objects associated with the individual node and the children nodes of the individual node to determine a second estimated execution time; (iii) determining a third estimated execution time for the code objects associated with the individual node and children nodes of the individual node if the code object associated with the individual node were to be executed on the host processor unit and the code objects associated with the children nodes of the individual node were executed on either the host processor unit or the accelerator based on which code objects associated with the children nodes were selected for offloading prior to performing (i), (ii) and (iii) for the individual node, the determining the third estimated execution time comprising summing a total estimated offload overhead time for the code objects associated with the children nodes of the individual node selected for offloading prior to performing (i), (ii), and (iii) being considered as offloaded together, a host processor execution time for the child object associated with the parent node, and a total estimated execution time for the children nodes of the parent node determined prior to performing (i), (ii), and (iii) for the individual node; (iv) if the first estimated execution time is the minimum of the first estimated execution time, the second estimated execution time, and the third estimated execution time, selecting the first estimated execution time as the estimated execution time of the parent node and selecting the code objects associated with the parent node and the children nodes of the parent node for offloading; (v) if the second estimated execution time is the minimum of the first estimated execution time, the second estimated execution time, and the third estimated execution time, selecting the second estimated execution time as the estimated execution time of the parent node and unselecting the code objects associated with the parent node and the children of the parent node for offloading; and (vi) if the third estimated execution time is the minimum of the first estimated execution time, the second estimated execution time, and the third estimated execution time, selecting the third estimated execution time as the estimated execution time of the parent node.

Example 13 is the method of Example 5, wherein the accelerator model is a first accelerator model that models behavior of a first accelerator, the generating the estimated accelerator metrics utilizing the first accelerator model and a second accelerator model that models behavior of a second accelerator to generate the estimated accelerator metrics based on the runtime metrics, the modeled data transfer metrics, and the runtime metrics, wherein the estimated accelerator metrics comprise, for individual of the code objects, an estimated accelerated time for the first accelerator and an estimated accelerator time for the second accelerator.

Example 14 is the method of Example 13, wherein the runtime metrics comprise a host processor unit execution time for individual of the code objects, the selecting the one or more code objects for offloading comprising: selecting as code objects for offloading to the first accelerator those code objects for which the estimated accelerated time for the first accelerator is less than the host processor unit execution time; and selecting as code objects for offloading to the second accelerator those code objects for which the estimated accelerated time for the second accelerator is less than the host processor unit execution time.

Example 15 is the method of Example 14, further comprising generating a heterogeneous program comprising the code objects selected for offloading and one or more of the code objects not selected for offloading that, when executed on a heterogeneous computing system comprising a target host processor unit, a first target accelerator, and a second target accelerator, executes the one or more of the code objects not selected for offloading on the target host processor unit, offloads the code objects selected for offloading to the first accelerator to the first target accelerator, and offloads the code objects selected for offloading to the second accelerator to the second target accelerator.

Example 16 is the method of Example 15, further comprising causing the heterogeneous program to be executed on the heterogeneous computing system.

Example 17 is the method of any of Examples 1-16, further comprising calculating an estimated accelerated time for a heterogeneous version of the program in which the code objects for offloading are offloaded to the accelerator.

Example 18 is the method of any of Examples 1-17, wherein the generating the estimated accelerator metrics for the program is further based on accelerator configuration information.

Example 19 is the method of Example 18, wherein the accelerator configuration information is first accelerator configuration information, the estimated accelerator metrics are first estimated accelerator metrics, the modeled accelerator cache metrics are first modeled accelerator cache metrics, the modeled data transfer metrics are first modeled data transfer metrics, the code objects selected for offloading are first code objects selected for offloading, the method further comprising: generating, utilizing the accelerator cache model, second modeled accelerator cache metrics based on the runtime metrics; generating, utilizing the data transfer model, second modeled data transfer metrics based on the runtime metrics; generating, utilizing the accelerator model, second estimated accelerator metrics based on the runtime metrics, the second modeled accelerator cache metrics, and second accelerator configuration information; and selecting one or more second code objects for offloading from the plurality of code objects based on the second estimated accelerator metrics, the second modeled data transfer metrics, and the runtime metrics.

Example 20 is the method of any of Examples 1-19, further comprising causing information identifying one or more of the code objects selected for offloading and one or more estimated accelerator metrics for individual of the code objects selected for offloading to be displayed on a display.

Example 21 is the method of one of Examples 1-14 and 17-20, further comprising generating a heterogeneous program comprising the code objects selected for offloading and one or more of the code objects not selected for offloading that, when executed on a heterogeneous computing system comprising a target host processor unit and target accelerator, executes the one or more of the code objects not selected for offloading on the target host processor unit and offloads the code objects selected for offloading to the target accelerator.

Example 22 is the method of Example 21, further comprising causing the heterogeneous program to be executed on the heterogeneous computing system.

Example 23 is an apparatus, comprising: one or more processors; and one or more non-transitory computer-readable storage media having instructions stored thereon that, when executed, cause the one or more processors to perform any one of the methods of Examples 1-22.

Example 24 is one or more non-transitory computer-readable storage media storing computer-executable instructions for causing a computing system to perform any one of the methods of Examples 1-22.

We claim:

1. A method, comprising:

generating runtime metrics for a program comprising a plurality of code objects, the runtime metrics indicating performance of the program executing on a host processor unit, wherein generating the runtime metrics comprises executing the program on the host processor unit in a non-offloaded mode in which the plurality of code objects are executed on the host processor unit and not on an accelerator;

generating, utilizing an accelerator cache model, modeled accelerator cache metrics based on the runtime metrics;

generating, utilizing a data transfer model, modeled data transfer metrics based on the runtime metrics;

generating, utilizing an accelerator model, estimated accelerator metrics based on the runtime metrics and the modeled accelerator cache metrics;

selecting one or more code objects of the plurality of code objects for offloading to an accelerator based on the estimated accelerator metrics, the modeled data transfer metrics, and the runtime metrics; and generating a heterogeneous program comprising the one or more code objects selected for offloading and one or more code objects of the plurality of code objects not selected for offloading that, when executed on a heterogeneous computing system comprising a target host processor unit and a target accelerator of the accelerator, executes the one or more code objects not selected for offloading on the target host processor unit and offloads the one or more code objects selected for offloading to the target accelerator.

2. The method of claim 1, wherein the generating the estimated accelerator metrics comprises, for individual of the plurality of code objects, determining an estimated accelerated time, an estimated accelerator execution time, and an estimated offload overhead time, wherein the estimated accelerated time is the estimated accelerator execution time plus the estimated offload overhead time.

3. The method of claim 2, wherein the determining the estimated accelerator execution time for individual of the plurality of code objects comprises:

determining an estimated compute-bound accelerator execution time for the individual code object based on one or more of the runtime metrics;

determining one or more estimated memory-bound accelerator execution times for the individual code object based on one or more of the modeled accelerator cache metrics, individual of the one or more estimated memory-bound accelerator execution times corresponding to a memory hierarchy level of a memory hierarchy available to the accelerator; and selecting a maximum of the estimated compute-bound accelerator execution time and the one or more estimated memory-bound accelerator execution times as the estimated accelerator execution time for the individual code object.

4. The method of claim 3, wherein the determining the estimated compute-bound accelerator execution time comprises, for the individual code objects that are loops:

determining a plurality of estimated compute-bound loop accelerator execution times for the individual code object, individual of the estimated compute-bound loop accelerator execution times based on a loop unroll factor from a plurality a of different loop unroll factors; and setting the estimated compute-bound accelerator execution time for the individual code object to a minimum of the estimated compute-bound loop accelerator execution times.

5. The method of claim 3, wherein the determining the estimated offload overhead time for the individual code object is based on one or more of the modeled data transfer metrics associated with the individual code object.

6. The method of claim 3, wherein the runtime metrics comprise a host processor unit execution time for individual of the plurality of code objects, the selecting the one or more code objects for offloading comprising selecting as the code objects for offloading those code objects for which the estimated accelerated time is less than the host processor unit execution time.

7. The method of claim 3, wherein the runtime metrics comprise a host processor unit execution time for individual of the plurality of code objects, the selecting the code objects for offloading comprising performing a bottom-up traversal of a call tree of the program, individual nodes of the call tree corresponding to one of the code objects, for individual nodes in the call tree reached during the bottom-up traversal:

(i) determining a first estimated execution time, the first estimated execution time a sum of a total estimated offload overhead time for the code objects associated with the individual node and children nodes of the individual node being considered as offloaded together, and a total estimated accelerator execution time for the code objects associated with the individual node and the children nodes of the individual node being considered as offloaded together;

(ii) summing the host processor unit execution times for the code objects associated with the individual node and the children nodes of the individual node to determine a second estimated execution time;

(iii) determining a third estimated execution time for the code objects associated with the individual node and children nodes of the individual node if the code object associated with the individual node were to be executed on the host processor unit and the code objects associated with the children nodes of the individual node were executed on either the host processor unit or the accelerator based on which code objects associated with the children nodes were selected for offloading prior to performing (i), (ii) and (iii) for the individual node, the determining the third estimated execution time comprising summing a total estimated offload overhead time for the code objects associated with the children nodes of the individual node selected for offloading prior to performing (i), (ii), and (iii) being considered as offloaded together, a host processor unit execution time for the code object associated with the individual node, and a total estimated execution time for the children nodes of the individual node determined prior to performing (i), (ii), and (iii) for the individual node;

(iv) if the first estimated execution time is a minimum of the first estimated execution time, the second estimated execution time, and the third estimated execution time, selecting the first estimated execution time as an estimated execution time of the individual node and selecting the code objects associated with the individual node and the children nodes of the individual node for offloading;

(v) if the second estimated execution time is a minimum of the first estimated execution time, the second estimated execution time, and the third estimated execution time, selecting the second estimated execution time as the estimated execution time of the individual node and unselecting the code objects associated with the individual node and the children nodes of the individual node for offloading; and (vi) if the third estimated execution time is a minimum of the first estimated execution time, the second estimated execution time, and the third estimated execution time, selecting the third estimated execution time as the estimated execution time of the individual node.

8. The method of claim 1, further comprising causing the heterogeneous program to be executed on the heterogeneous computing system.

9. The method of claim 1, wherein the modeled data transfer metrics comprise an estimated data transfer overhead between the host processor unit and an accelerator for at least one of the code objects.

10. A computing system comprising:

one or more processors; and one or more non-transitory computer-readable storage media having instructions stored thereon that, when executed, cause the one or more processors to:

generate runtime metrics for a program comprising a plurality of code objects, the runtime metrics indicating performance of the program executing on a host processor unit, wherein generating the runtime metrics comprises executing the program on the host processor unit in a non-offloaded mode in which the plurality of code objects are executed on the host processor unit and not on an accelerator;

generate, utilizing an accelerator cache model, modeled accelerator cache metrics based on the runtime metrics;

generate, utilizing a data transfer model, modeled data transfer metrics based on the runtime metrics;

generate, utilizing an accelerator model, estimated accelerator metrics based on the runtime metrics and the modeled accelerator cache metrics;

select one or more code objects of the plurality of code objects for offloading to an accelerator based on the estimated accelerator metrics, the modeled data transfer metrics, and the runtime metrics; and generate a heterogeneous program comprising the one or more code objects selected for offloading and one or more code objects of the plurality of code objects not selected for offloading that, when executed on a heterogeneous computing system comprising a target host processor unit and a target accelerator of the accelerator, executes the one or more code objects not selected for offloading on the target host processor unit and offloads the one or more code objects selected for offloading to the target accelerator.

11. The computing system of claim 10, wherein to generate the estimated accelerator metrics comprises, for individual of the plurality of code objects, to determine an estimated accelerated time, an estimated accelerator execution time, and an estimated offload overhead time, wherein the estimated accelerated time is the estimated accelerator execution time plus the estimated offload overhead time.

12. One or more non-transitory computer-readable storage media storing computer-executable instructions for causing a computing system to:

generate runtime metrics for a program comprising a plurality of code objects, the runtime metrics indicating performance of the program executing on a host processor unit, wherein generating the runtime metrics comprises executing the program on the host processor unit in a non-offloaded mode in which the plurality of code objects are executed on the host processor unit and not on an accelerator;

generate, utilizing an accelerator cache model, modeled accelerator cache metrics based on the runtime metrics;

generate, utilizing a data transfer model, modeled data transfer metrics based on the runtime metrics;

generate, utilizing an accelerator model, estimated accelerator metrics based on the runtime metrics and the modeled accelerator cache metrics;

select one or more code objects of the plurality of code objects for offloading to an accelerator based on the estimated accelerator metrics, the modeled data transfer metrics, and the runtime metrics; and generate a heterogeneous program comprising the one or more code objects selected for offloading and one or more code objects of the plurality of code objects not selected for offloading that, when executed on a heterogeneous computing system comprising a target host processor unit and a target accelerator of the accelerator, executes the one or more code objects not selected for offloading on the target host processor unit and offloads the one or more code objects selected for offloading to the target accelerator.

13. The one or more non-transitory computer-readable storage media of claim 12, to generate the estimated accelerator metrics comprising, for individual of the plurality of code objects, to determine an estimated accelerated time, an estimated accelerator execution time, and an estimated offload overhead time, wherein the estimated accelerated time is the estimated accelerator execution time plus the estimated offload overhead time.

14. The one or more non-transitory computer-readable storage media of claim 13, to determine the estimated accelerator execution time for individual of the plurality of code objects comprising to:

determine an estimated compute-bound accelerator execution time for the individual code object based on one or more of the runtime metrics;

determine one or more estimated memory-bound accelerator execution times for the individual code object based on one or more of the modeled accelerator cache metrics, individual of the estimated memory-bound accelerator execution times corresponding to a memory hierarchy level of a memory hierarchy available to the accelerator; and to select a maximum of the estimated compute-bound accelerator execution time and the estimated memory-bound accelerator execution times as the estimated accelerator execution time for the individual code object.

15. The one or more non-transitory computer-readable storage media of claim 14, to determine the estimated compute-bound accelerator execution time comprising, for the individual code objects that are loops:

to determine a plurality of estimated compute-bound loop accelerator execution times for the individual code object, individual of the estimated compute-bound loop accelerator execution times based on a loop unroll factor from a plurality a of different loop unroll factors; and to set the estimated compute-bound accelerator execution time for the individual code object to a minimum of the estimated compute-bound loop accelerator execution times.

16. The one or more non-transitory computer-readable storage media of claim 13, wherein to determine the estimated offload overhead time for the individual code object is based on one or more of the modeled data transfer metrics associated with the individual code object.

17. The one or more non-transitory computer-readable storage media of claim 13, wherein the runtime metrics comprise a host processor unit execution time for individual of the plurality of code objects, to select the one or more code objects for offloading comprising to select as the one or more code objects for offloading those code objects for which the estimated accelerated time is less than the host processor unit execution time.

18. The one or more non-transitory computer-readable storage media of claim 13, wherein the accelerator model is a first accelerator model that models behavior of a first accelerator, to generate the estimated accelerator metrics utilizing the first accelerator model and a second accelerator model that models behavior of a second accelerator to generate the estimated accelerator metrics based on the modeled accelerator cache metric, and the runtime metrics, wherein the estimated accelerator metrics comprise, for individual of the plurality of code objects, an estimated accelerated time for the first accelerator and an estimated accelerator time for the second accelerator.

19. The one or more non-transitory computer-readable storage media of claim 18, wherein the runtime metrics comprise a host processor unit execution time for individual of the plurality of code objects, to select the one or more code objects for offloading comprising to:

select as code objects for offloading to the first accelerator those code objects for which the estimated accelerated time for the first accelerator is less than the host processor unit execution time; and select as code objects for offloading to the second accelerator those code objects for which the estimated accelerated time for the second accelerator is less than the host processor unit execution time.

20. The one or more non-transitory computer-readable storage media of claim 12, wherein the modeled data transfer metrics comprise an estimated data transfer overhead between the host processor unit and an accelerator for at least one of the code objects.

* * * * *